United States Patent
Abi-Saleh

(10) Patent No.: US 9,632,699 B2
(45) Date of Patent: Apr. 25, 2017

(54) USER-CONFIGURABLE CALCULATOR

(76) Inventor: Hanna Fouad Abi-Saleh, Adma (LB)

( * ) Notice: Subject to any disclaimer, the term of this patent is extended or adjusted under 35 U.S.C. 154(b) by 850 days.

(21) Appl. No.: 13/402,864

(22) Filed: Feb. 22, 2012

(65) Prior Publication Data

US 2013/0219312 A1  Aug. 22, 2013

(51) Int. Cl.
  *G06F 3/0488* (2013.01)
  *G06F 15/02* (2006.01)

(52) U.S. Cl.
  CPC ...... *G06F 3/04886* (2013.01); *G06F 15/0225* (2013.01)

(58) Field of Classification Search
  CPC .......................... G06F 15/0225; G06F 3/04886
  See application file for complete search history.

(56) References Cited

U.S. PATENT DOCUMENTS

| | | | | |
|---|---|---|---|---|
| 4,180,854 A * | 12/1979 | Walden et al. | | 708/130 |
| 4,823,311 A | 4/1989 | Hunter et al. | | |
| 5,471,612 A * | 11/1995 | Schlafly | | 715/210 |
| 5,525,978 A | 6/1996 | York et al. | | |
| 5,633,998 A * | 5/1997 | Schlafly | | 714/1 |
| 5,936,614 A | 8/1999 | An et al. | | |
| 5,937,042 A * | 8/1999 | Sofman | | 379/112.05 |
| 6,181,344 B1 | 1/2001 | Tarpenning et al. | | |
| 6,212,524 B1 * | 4/2001 | Weissman et al. | | 707/600 |
| 6,724,370 B2 | 4/2004 | Dutta et al. | | |
| 7,170,429 B2 | 1/2007 | Koppich | | |
| 7,400,270 B2 | 7/2008 | Lutnick et al. | | |
| 7,429,979 B2 | 9/2008 | Mears et al. | | |
| 7,602,378 B2 | 10/2009 | Kocienda et al. | | |
| 7,739,224 B1 * | 6/2010 | Weissman et al. | | 707/794 |
| 2001/0033243 A1 | 10/2001 | Harris et al. | | |
| 2002/0016639 A1 * | 2/2002 | Smith et al. | | 700/9 |
| 2004/0104945 A1 * | 6/2004 | Kearns et al. | | 345/853 |
| 2005/0122543 A1 * | 6/2005 | Walker | | 358/1.18 |
| 2006/0195794 A1 * | 8/2006 | Sun et al. | | 715/762 |
| 2006/0200548 A1 * | 9/2006 | Min | | 709/224 |
| 2007/0250421 A1 * | 10/2007 | Major et al. | | 705/35 |
| 2007/0266135 A1 * | 11/2007 | Friedland et al. | | 709/223 |
| 2008/0302582 A1 | 12/2008 | Sekhri et al. | | |
| 2009/0033522 A1 | 2/2009 | Skillman et al. | | |

(Continued)

OTHER PUBLICATIONS

Ryan Detzel, "CustomCalc iPad App—Creating your own calculator", uploaded Apr. 1, 2010, accessed on May 16, 2013, accessed from internet <URL: http://vimeo.com/10622822>, 00:01-16:24.*

(Continued)

*Primary Examiner* — Ajay Bhatia
*Assistant Examiner* — Nicholas Klicos
(74) *Attorney, Agent, or Firm* — Law Office of Steven R. Olsen, PLLC; Steven R. Olsen

(57) ABSTRACT

The invention relates generally to a user-configurable calculator. Embodiments of the invention provide, among other things, a flexible graphical user interface (GUI) that allows a user to configure a virtual keypad area and/or a display area. Accordingly, a user can select calculator's keys (and corresponding functions) and/or a display type that is best suited for the problem he or she wishes to solve. A user may also create a new function and associate the new function with a virtual key. Embodiments of the invention also permit a user to define and manage multiple calculation sessions. In one embodiment, data can be shared between sessions.

1 Claim, 25 Drawing Sheets

(56) References Cited

U.S. PATENT DOCUMENTS

| | | | |
|---|---|---|---|
| 2009/0040074 A1 | 2/2009 | McTavish et al. | |
| 2009/0174663 A1 | 7/2009 | Rudd | |
| 2009/0183098 A1 | 7/2009 | Casparian et al. | |
| 2009/0254597 A1* | 10/2009 | Karoji | 708/130 |
| 2009/0327942 A1* | 12/2009 | Eldridge et al. | 715/771 |
| 2010/0083161 A1* | 4/2010 | Yoshizawa | 715/773 |
| 2010/0107095 A1* | 4/2010 | Singh et al. | 715/764 |
| 2010/0269061 A1* | 10/2010 | Cantor et al. | 715/780 |
| 2011/0119282 A1* | 5/2011 | Gorman et al. | 707/755 |
| 2011/0154362 A1* | 6/2011 | Levy | 719/313 |
| 2013/0173896 A1* | 7/2013 | Parker et al. | 713/1 |

OTHER PUBLICATIONS

Hp calculators, "HP 50g Calculator Modes and Customization", pp. 1-6.* wrotniak.net, Kalculator, The Mother of all Calculators, viewed Dec. 17, 2009 at http://www.wrotniak.net/works/kalkulator/index.htm.

J.A. Associates, The RPN Engineering Calculator, viewed on Dec. 17, 2009 at http://www.j-a-associates.com/rpn_calculator.htm.

Runiter Company, Smart Math Calculator—The Best Free Calculator in the World!, viewed on Dec. 17, 2009 at http://calculator.runiter.com/math-calculator/.

Starline Software, Numeric Keypad, viewed on Dec. 17, 2009 at http://www.starlinesoftware.com/NumericKeypad.htm.

Apple, Inc., Multi Calc 6x4 for iPad by Illumipad LLC, viewed on Sep. 30, 2010 at http://itunes.apple.com/us/app/multi-calc-6x4/id388836351?mt=8.

farsightsoft.com, Farsight Calculator, viewed on Dec. 17, 2009 at http://www.farsightsoft.com/farsightcalculator.html.

Apple, Inc., Calcbot—The Intelligent Calculator by Tapbots, viewed on Jan. 9, 2011 at http://itunes.apple.com/lb/app/id376694347?mt=8#.

Suzhar Entertainment, Calculator Construction Kit, Users Manual, 2009, available at www.suzhar.com/assets/files/cck/CCKUsersMan_draft1.pdf.

Moffsoft, Calculator 2, viewed on Jul. 15, 2009, last viewed on Feb. 22, 2012 at http://www.moffsoft.com/moffcalc.htm.

* cited by examiner

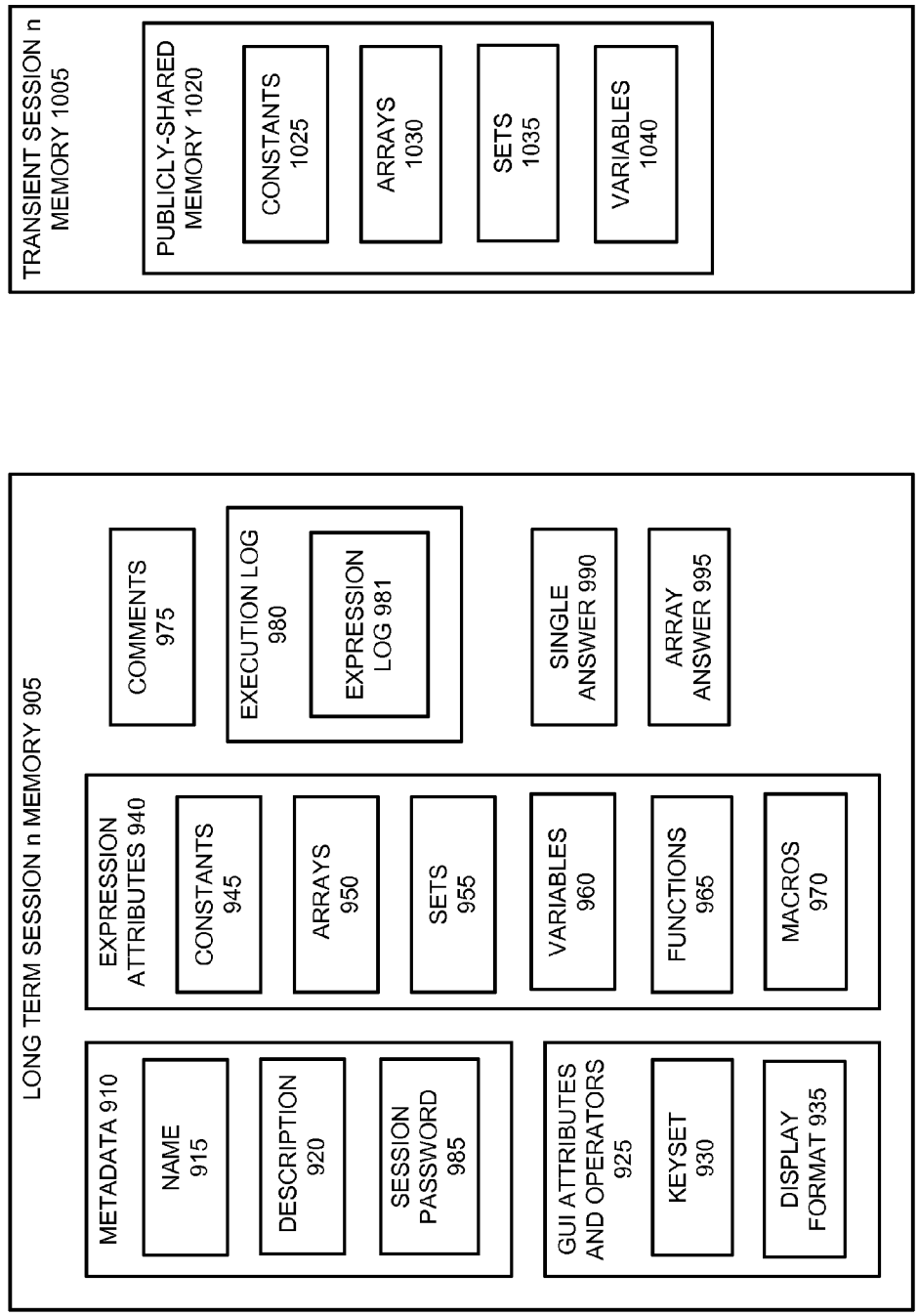

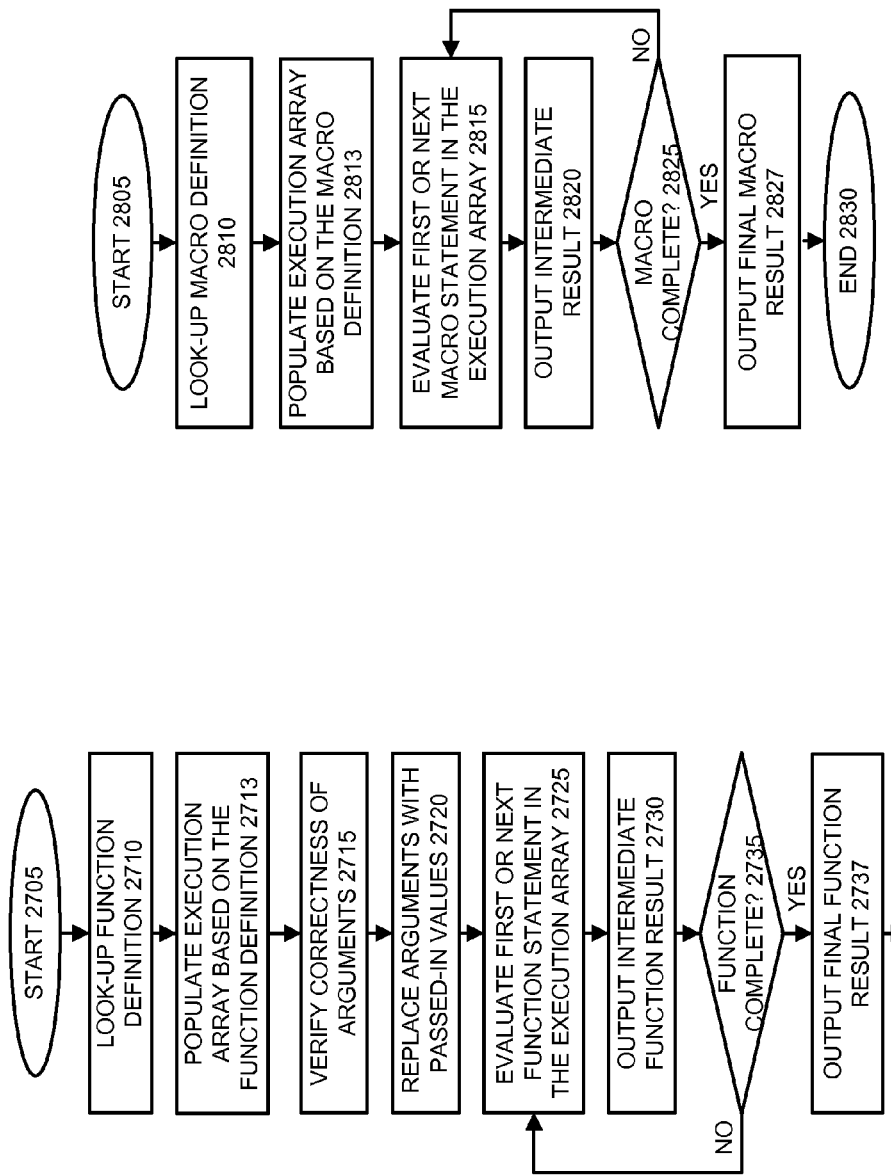

USER-CONFIGURABLE CALCULATOR

BACKGROUND

Field of the Invention

The invention relates generally to the field of special-purpose computers. In particular, but not by way of limitation, the invention relates to a calculator that can be configured by an end user.

Description of Related Art

Various types of electronic calculators are known. Conventional calculators have many disadvantages, however. For instance, many calculators are only suitable for a narrow range of purposes. One may include functions suitable for solving trigonometry problems; another may include functions used in finance. A user may therefore require multiple calculators.

Another limitation of known calculators is that they are typically configured to output only a final result based on a single expression. This is disadvantageous for cases where a user might want to view an intermediate result, use the intermediate result in a later calculation, and/or logically branch to an alternative calculation based on the intermediate result.

Therefore, a need exists for a calculator that allows a user to solve his or her own range of problems and/or provides the user with better access to intermediate results.

BRIEF SUMMARY OF THE INVENTION

Embodiments of the invention seek to overcome one or more of the limitations described above. Embodiments of the invention provide, among other things, a flexible graphical user interface (GUI) that allows a user to configure a virtual keypad area and/or a display area. Accordingly, a user can select calculator's keys (and corresponding functions) and/or a display type that is best suited for the problem he or she wishes to solve. A user may also create a new function and associate the new function with a virtual key. Embodiments of the invention also permit a user to define and manage multiple calculation sessions. In one embodiment, data can be shared between sessions.

Embodiments of the invention provide a calculator, the calculator including a processor and a memory coupled to the processor. In such embodiments, the memory may include a key superset having attributes associated with a plurality of system-defined keys and at least one user-defined key. The memory may further include at least one user-defined keyset, the at least one user-defined keyset including a subset of the key superset. The memory may also include a session memory configured to store attributes associated with a plurality of calculator sessions, wherein each of the plurality of calculator sessions is associated with the evaluation of at least one expression.

BRIEF DESCRIPTION OF THE DRAWINGS

FIG. 9 is a functional block diagram of a long-term session memory, according to an embodiment of the invention;

FIG. 10 is a functional block diagram of a transient session memory, according to an embodiment of the invention;

FIG. 27 is a flow diagram of a function execution process, according to an embodiment of the invention; and FIG. 28 is a flow diagram of a macro execution process, according to an embodiment of the invention.

DETAILED DESCRIPTION OF THE INVENTION

Embodiments of the invention will now be described more fully with reference to FIGS. 1 through 28. The invention may, however, be embodied in many different forms and should not be construed as limited to the embodiments set forth herein. Rather, these embodiments are provided so this disclosure will enable a person having ordinary skill in the art to practice the claimed invention. Although subheadings are used below, the description of any feature is not necessarily limited to any particular section of this specification.

Introduction

Figure 1:
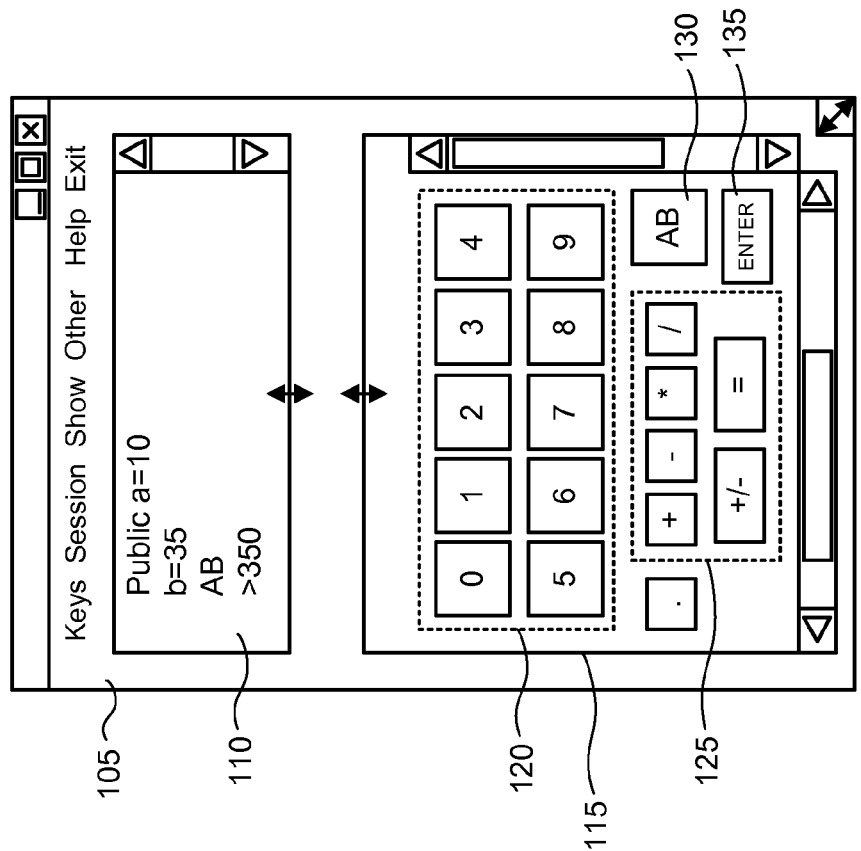
FIG. 1 is an illustration of a graphical user interface (GUI) for a calculator, according to an embodiment of the invention.

In one respect, embodiments of the invention permit a user to reconfigure the keypad and/or display area of a calculator. FIG. 1 is an illustration of a graphical user interface (GUI) for a calculator, according to an embodiment of the invention. As illustrated in FIG. 1, a GUI window 105 includes a text display area 110 and a virtual keypad area 115. The virtual keypad area 115 includes value keys 120, function keys 125, macro key 130 and an administrative key 135. As illustrated in FIG. 1, windows associated with the text display area 110 and the virtual keypad area 115 may be expandable in size, subject to the limitations of the GUI window 105.

Figure 2:
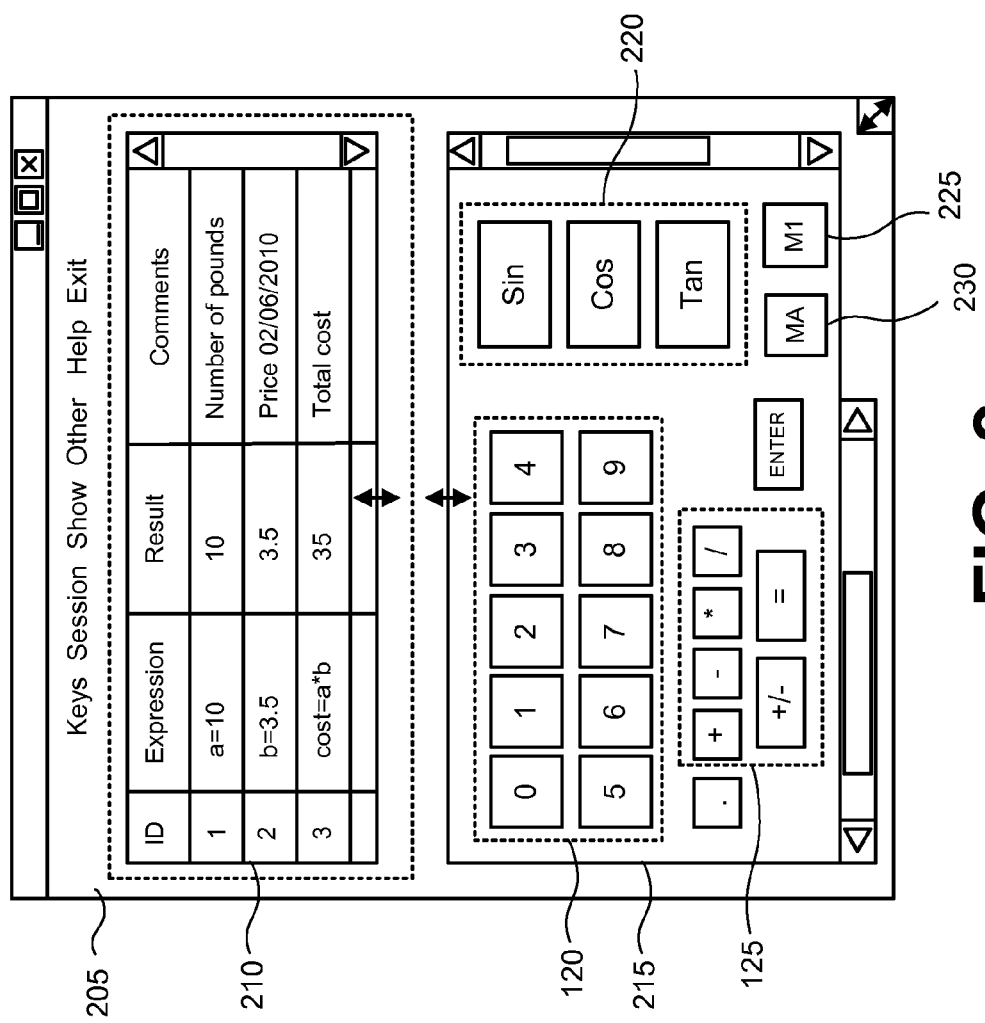
FIG. 2 is an illustration of a graphical user interface (GUI) for a calculator, according to an embodiment of the invention.

FIG. 2 is an illustration of a graphical user interface (GUI) for a calculator, according to an embodiment of the invention. As illustrated in FIG. 2, a GUI window 205 may include a spreadsheet display area 210. The illustrated spreadsheet display area 210 displays multiple expressions. The display area 210 also provides a result and optional comment associated with each of the multiple expressions. A virtual keypad area 215 includes added function keys 220, a memory key 225, and a memory array key 230. As illustrated in FIG. 2, windows associated with the spreadsheet display area 210 and the virtual keypad area 215 may be expandable in size, subject to the limitations of the GUI window 205.

Advantageously, a single user-configurable calculator may be able to provide the alternative GUI's illustrated in FIGS. 1 and 2. Many other configurations are also possible, however, as will be apparent from the discussion below.

Calculator System Overview

Figure 3:
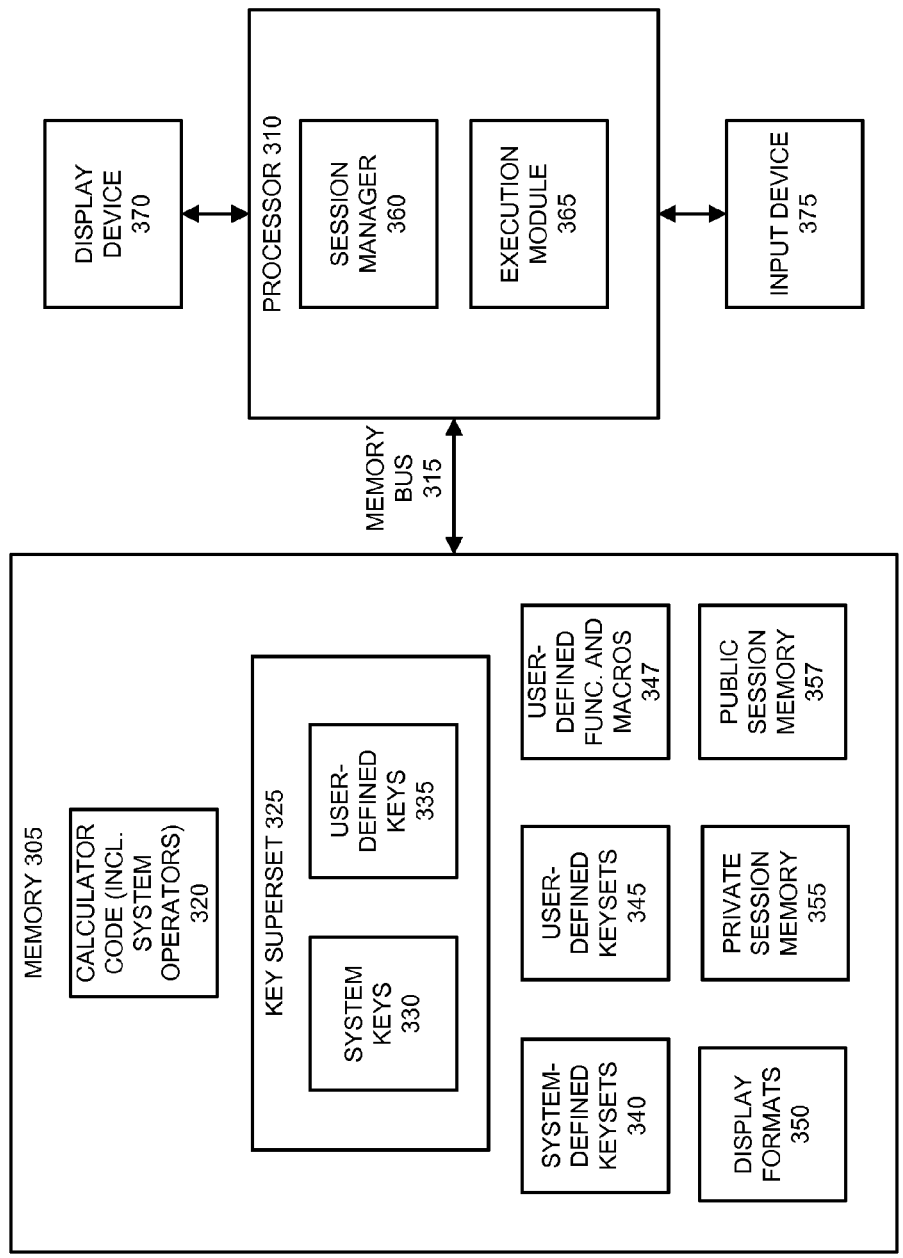
FIG. 3 is a functional block diagram of a calculator system, according to an embodiment of the invention.

FIG. 3 is a functional block diagram of a calculator system, according to an embodiment of the invention. As illustrated in FIG. 3, a memory 305 may be coupled to a processor 310 via a memory bus 315. The memory 305 may include calculator code (including system operators) 320, a key superset 325, system-defined keysets 340, user-defined keysets 345, user-defined functions and macros 347, display formats 350, a private session memory 355 and a public session memory 357. The key superset 325 may include system keys 330 and user-defined keys 335. The processor 310 includes a session manager 360 and an execution module 365. The processor may be further coupled to a display device 370 and an input device 375.

Figure 5:
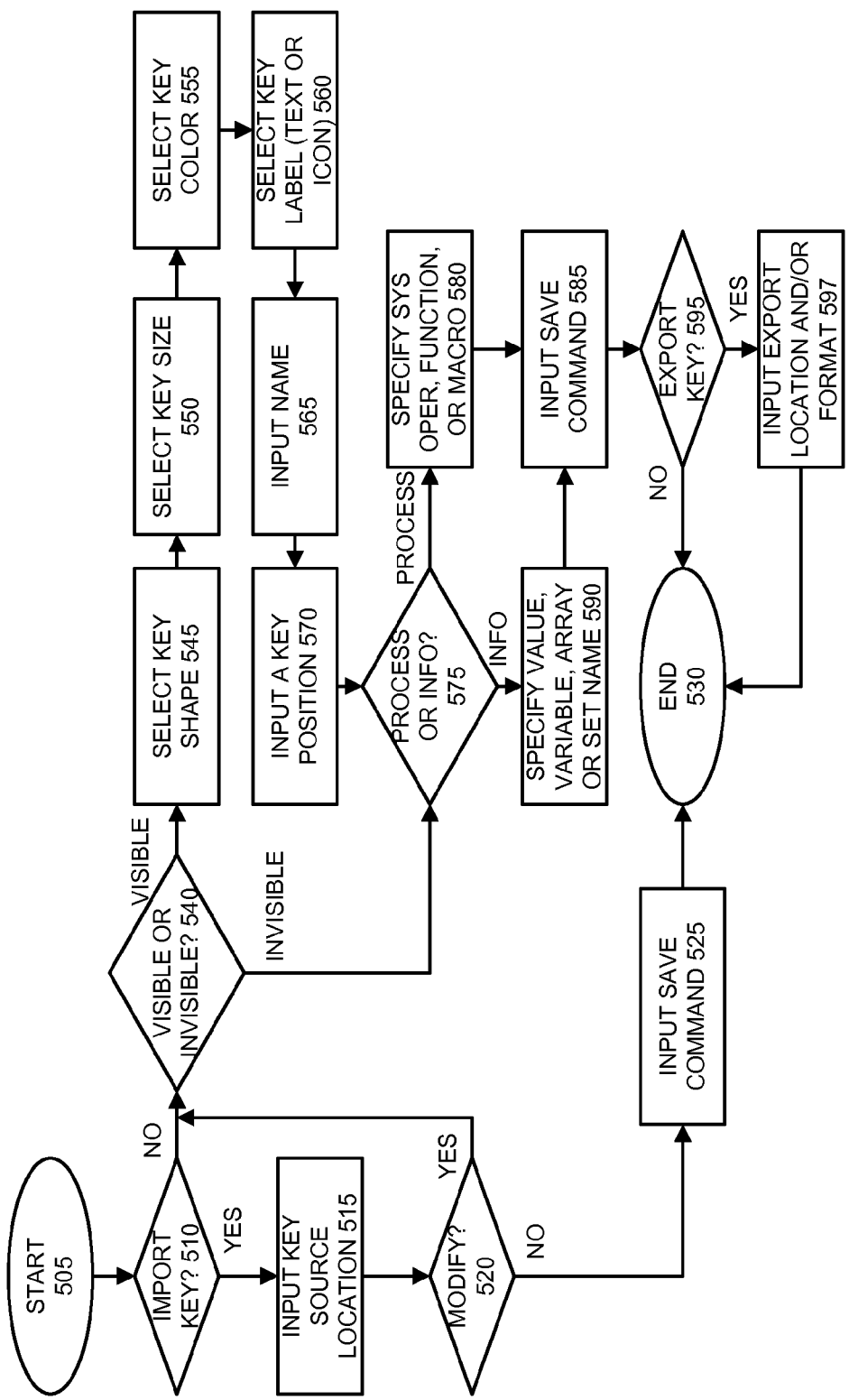
FIG. 5 is a flow diagram of a process for defining a virtual key from a user perspective, according to an embodiment of the invention.
Figure 6:
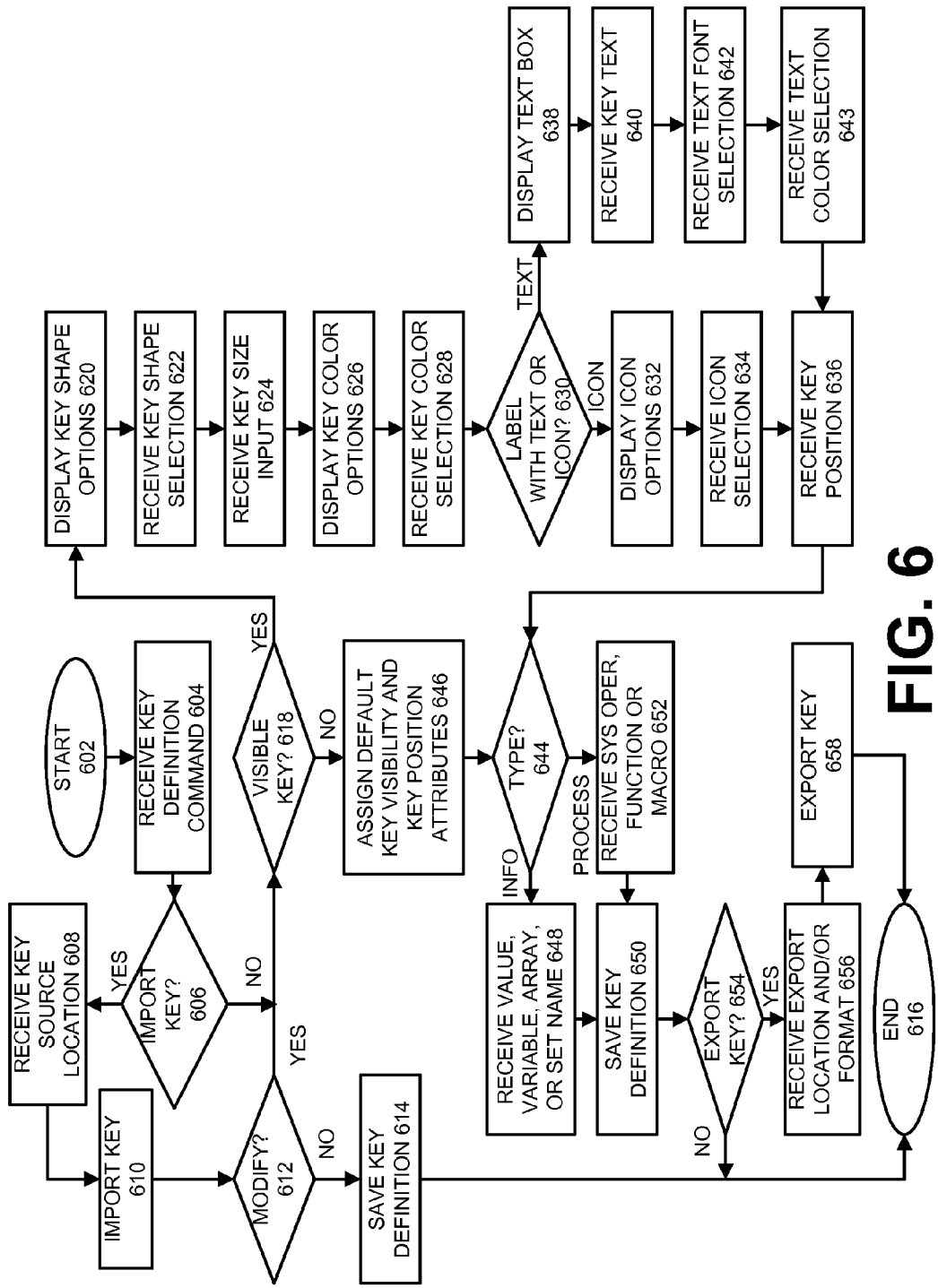
FIG. 6 is a flow diagram of a process for defining a virtual key from a system perspective, according to an embodiment of the invention.
Figure 7:
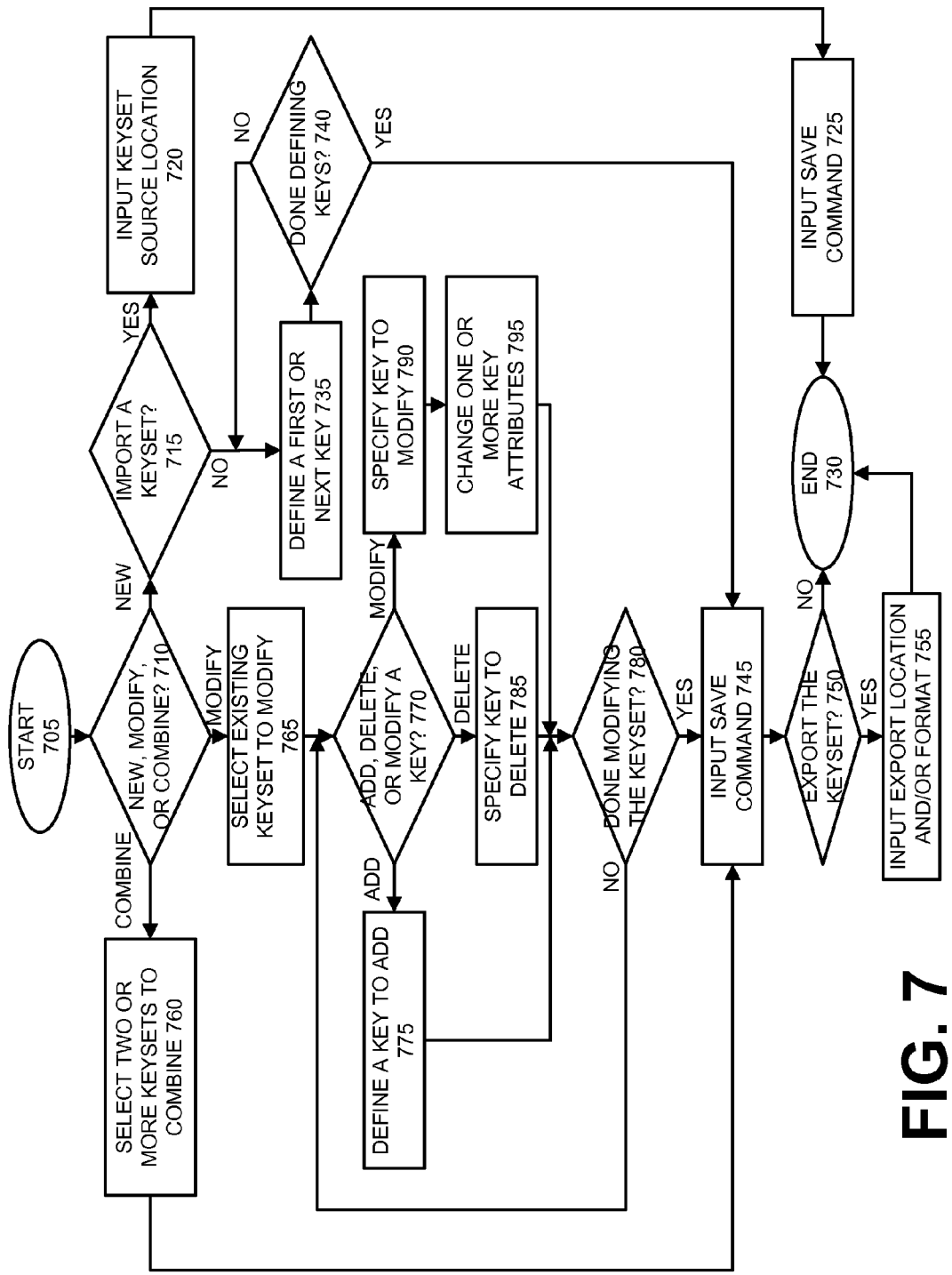
FIG. 7 is a flow diagram of a process for defining or modifying a keyset from a user perspective, according to an embodiment of the invention.
Figure 8:
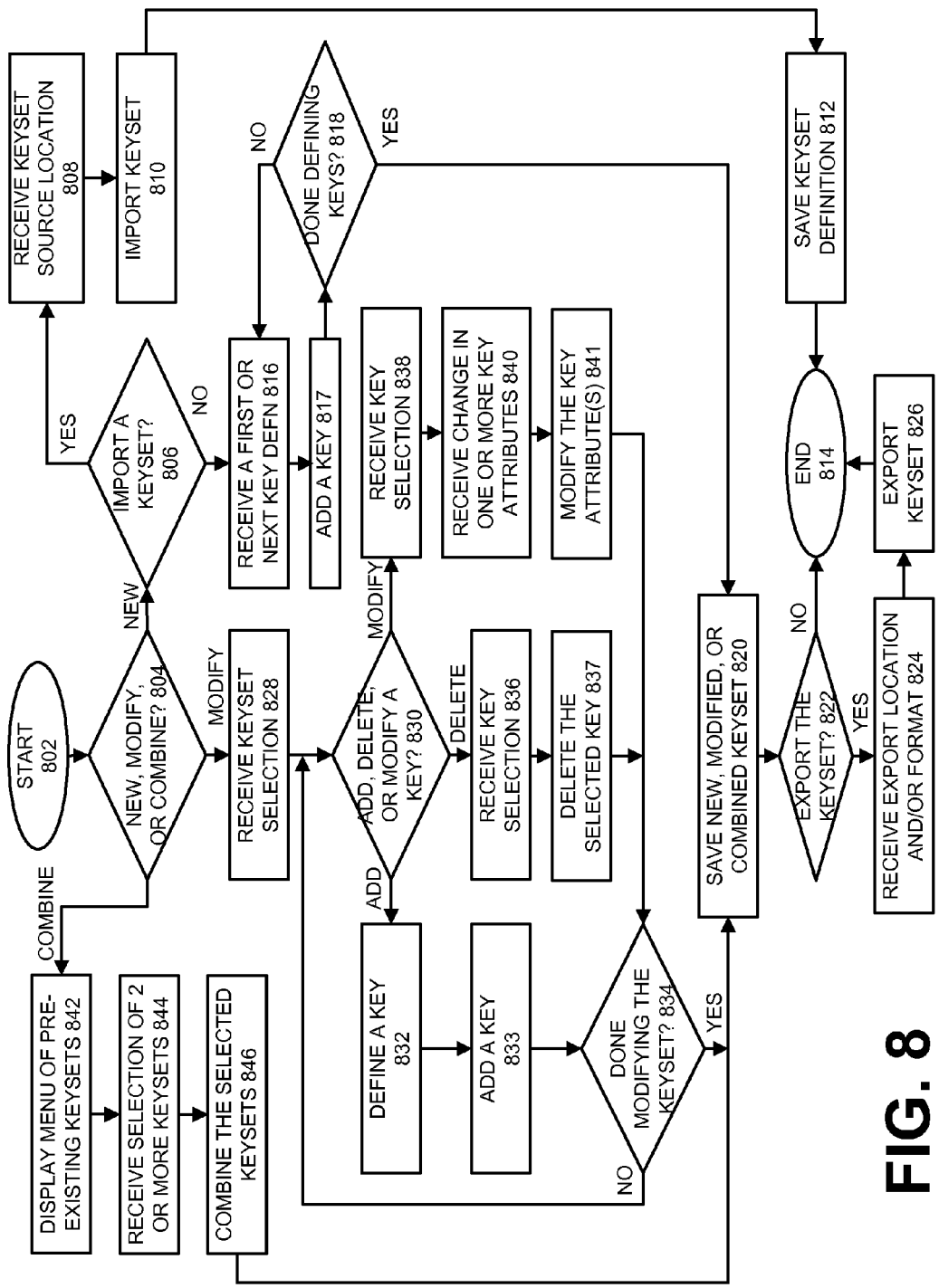
FIG. 8 is a flow diagram of a process for defining or modifying a keyset from a system perspective, according to an embodiment of the invention.

As used herein, the key superset 325 is a collection of individual virtual key definitions. The system keys 330 may be defined, for example, by the calculator manufacturer; each of the user-defined keys 335 may be defined by one or more users. Each of the system-defined keysets 340 represents a grouping of one or more system keys 330, and one of the system-defined keysets 340 may be a default keyset. Each of the user-defined keysets 345 is a grouping of one or more systems keys 330 and/or user-defined keys 335. In embodiments of the invention, any one or more of the system keys 330, user-defined keys 335, system-defined keysets 340, and/or user-defined keysets 345 may be imported to and/or exported from the calculator system. Various types of virtual keys are described below with reference to FIGS. 4A-4C. FIGS. 5 and 6 provide processes for defining a key; FIGS. 7 and 8 provide processes for defining or modifying a keyset.

The display formats 350 may include, for instance, options for a textbox display area 110 or a spreadsheet display area 210. In embodiments of the invention, any one or more of the display formats 350 may be imported to and/or exported from the calculator system.

As used herein, a session (or calculation session) is defined by associated metadata, GUI features, operators, expression(s), answers (calculation results) and/or other attributes as described below with reference to FIGS. 9 and 10. The private session memory 355 refers to such attributes that are associated with a single session; the public session memory 357 refers to session attributes that may be shared between sessions. The session manager 360 may control, for instance, the exemplary processes illustrated in FIGS. 17 (a single-session mode) and 20 (a multi-session mode).

The execution module 365 provides an expression result for each received expression. An exemplary functional architecture for the execution module 365 is presented in FIG. 25; exemplary execution processes are described below with reference to FIGS. 26-28.

Variations to the functional block diagram illustrated in FIG. 3 are possible. For instance, in alternative embodiments, there may only be a single (default) system-defined keyset 340 rather than multiple system-defined keysets 340. Likewise, there may be a single display format 350 rather than multiple display formats 350. Moreover, alternative embodiments may not include the notion of a public session memory 357.

On hardware platforms that include external input devices 375 (such as a keyboard and/or mouse), a user may, for example, select a key on the virtual keypad area 115, 215 using the mouse. Alternatively, a user may, for example, input the label of a key illustrated in the virtual keypad area 115, 215 from the keyboard device. So there may be multiple input methods on such platforms. On a hardware platform having a touch screen device, there may only be one input device 375: the touch screen itself.

In alternative embodiments of the invention, the calculator system may also include a facility for external communications, for instance to the internet or other network, that is not shown in FIG. 3.

Features illustrated in the functional block diagram of FIG. 3 may be implemented in hardware, software, or a combination of hardware and software. For instance, the functions may be implemented on a personal computer (PC), a tablet PC, a personal digital assistance (PDA), a smart phone, or a dedicated calculator platform. The memory 305 preferably includes non-volatile memory (NVM).

Virtual Keys

The system keys 330 and user-defined keys 335 are considered virtual because associated attributes are defined in software and because they may be rendered in a GUI rather than hardware.

Figure 4B:
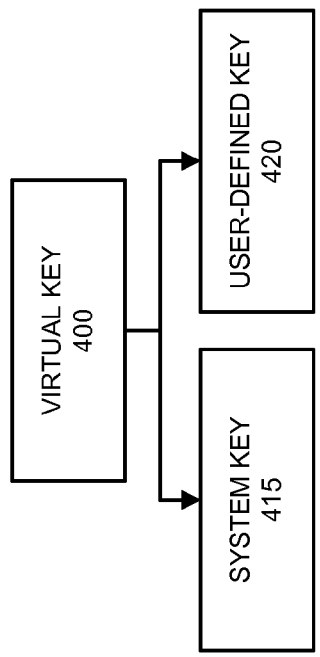
FIGS. 4A-4C are definition trees associated with a virtual key, according to an embodiment of the invention.
Figure 4A:
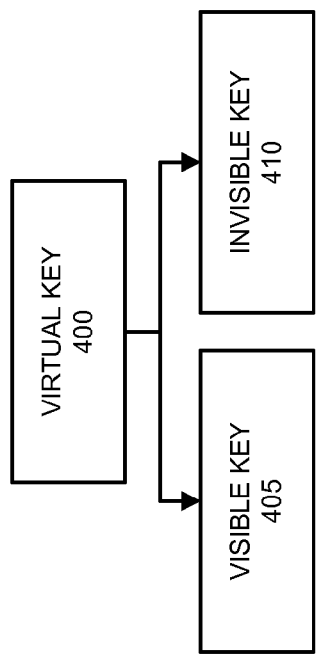
Figure 4C:
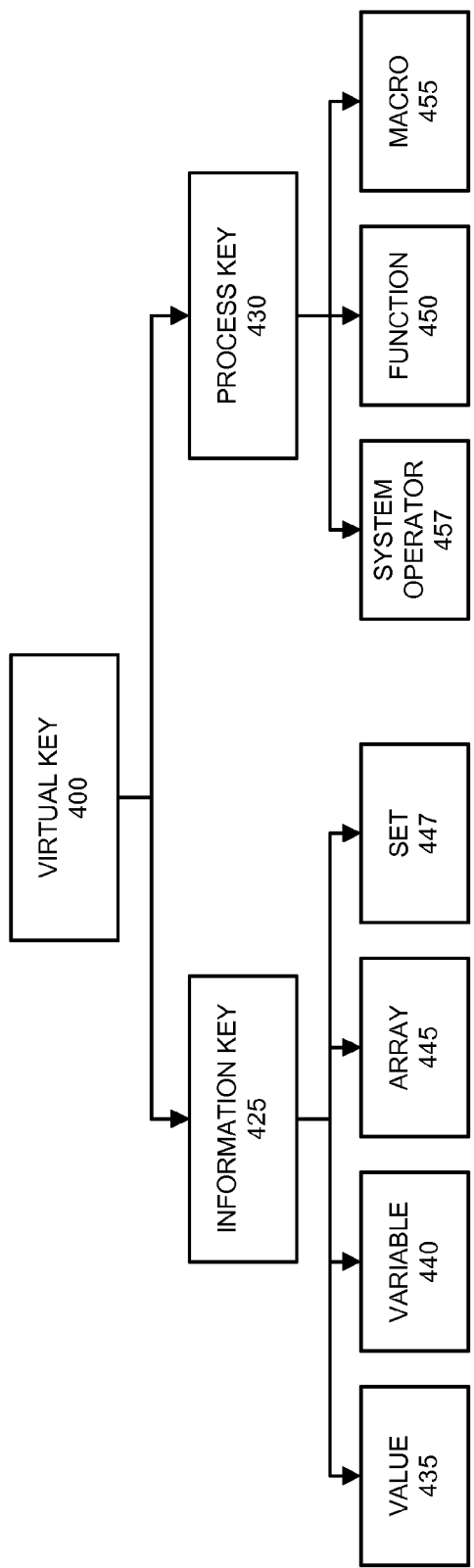

FIGS. 4A-4C are definition trees associated with a virtual key, according to an embodiment of the invention. As illustrated in FIG. 4A, a virtual key 400 may be a visible key 405 or an invisible key 410. A visible key 405 is one that is displayed in the GUI and can be selected by a user. An invisible key 410 is not displayed in the GUI. On systems with external input device 375, for instance hardware keyboard, a user may select the invisible key 410 from the external input device 375. The application of one or more invisible keys 410 may reduce the amount of space on a display required to render a GUI 105, 205. Invisible keys 410 are not sensible on platforms that do not have an external input device 375. Operators that are not associated with either a visible key 405 or an invisible key 410 cannot be exploited by a user.

As illustrated in FIG. 4B, a virtual key 400 may be a system key 415 or a user-defined key 420. As discussed above with reference to FIG. 3, system keys 415 may be provided by a calculator system manufacturer.

As illustrated in FIG. 4C, a virtual key 400 may be an information key 425 or a process key 430. With respect to information keys 425, the virtual key 400 may be associated with a value 435, a variable 440, an array 445, or a set 447. With further regard to the process key 430, the virtual key 400 may be related to a function 450, macro 455, or system operator 457. A function key 450 and macro key 455 are user-defined, whereas a system operator key (or system key) 457 is a predetermined part of the system configuration.

A definition for a virtual key 400 may include both GUI and functional attributes. FIGS. 5 and 6 provide exemplary processes for defining a key from the perspective of a user and a calculator system, respectively.

FIG. 5 is a flow diagram of a process for defining a virtual key from a user perspective, according to an embodiment of the invention. As illustrated in FIG. 5, the process begins in step 505. A user then decides whether to import a key in step 510. Where a key is to be imported, a user inputs a key source location in step 515 and then decides whether to modify the imported key definition in step 520. If the user will not modify the imported key, the user inputs a save command in step 525 and the process terminates in step 530.

If the user does not import a key definition, or if the user wishes to modify an imported key definition, then the user determines whether the key is a visible key type or an invisible key type in step 540. In the case of a visible key type, the user selects a key shape in step 545, a key size in step 550, a key color in step 555, a key label (text or icon) in step 560, a key name in step 565, and a key position in step 570.

After inputting a key position in step 570 or selecting an invisible key in step 540, the user then determines whether the key will be a process key type or an information key type in step 575. In the case of a process key, the user specifies a system operator, function or macro in step 580 before inputting a save command in step 585. In the case of an information key, the user inputs a value, a variable name, an array name, or the name of a set in step 590 before inputting a save command in step 585.

After saving a new or modified key definition, the user can decide whether to export the key definition in step 595. If the user does not wish to export the key definition, then the process terminates in step 530. Otherwise, the user inputs an export location and/or format in step 597 before terminating in step 530.

Variations to the process illustrated in FIG. 5 are possible. For instance, alternative embodiments may not allow a user to import, export, and/or modify an imported key. Moreover, alternative embodiments may provide default input and/or export locations, and/or output formats. Embodiments may not allow a user to create an invisible key. Moreover, any one or more of GUI parameter-setting steps 545-570 could include the user entering parameter data into a text field, selecting a parameter value from a menu, or other input method. In addition, in alternative embodiments, not all GUI parameter-setting steps 545-570 are required, for instance where the calculator provides default selections for one or more GUI parameters.

FIG. 6 is a flow diagram of a process for defining a virtual key from a system perspective, according to an embodiment of the invention. As illustrated in FIG. 6, the process begins in step 602, receives a key definition command in step 604, and determines whether a key definition is to be imported in step 606.

If the key is to be imported, the system receives a key source location in step 608, imports the key in step 610, and determines whether the imported key is to be modified in step 612. If the imported key will not be modified, the process saves the key definition in step 614 and terminates in step 616.

If the process determines in step 606 that a key is not being imported, or if the process determines in step 612 that an imported key is to be modified, then the process advances to step 618 to determine whether the key definition command relates to a visible key. For a visible key, the process displays key shape options in step 620, receives a key shape selection in step 622, receives a key size input in step 624, displays key color options in step 626, and receives a key color selection in step 628. Next, in conditional step 630, the process determines whether the key will be labeled with text or an icon.

Where text is to be used, the process displays a text box in step 638, receives key text in step 640, receives a text font selection in step 642, receives a text color selection in step 643, and receives key position information in step 636. Where the key is being labeled with an icon, the process displays icon options in step 632 and receives an icon selection in step 634 before receiving the key position information in step 636.

Where it is determined in conditional step 618 that an invisible key is being defined, the process assigns default key visibility and key position attributes in step 646. Subsequent to steps 636 and 646, the process determines whether the key is an informational type or a process type in conditional step 644. For an information type key, the process receives a value or variable, array or set name in step 648 and saves a key definition in step 650. For a process type key, the process receives a system operator selection, function, or macro in step 652 before saving the key definition in step 650.

Next, in step 654, the process determines whether the key definition is to be exported. If so, the process receives an export location and/or format in step 656 and exports the key in step 658 before terminating in step 616. If the key definition is not being exported, the process terminates in step 616.

Variations to the process illustrated in FIG. 6 are possible. For instance, alternative embodiments may not perform import, export, and/or modify functions. Embodiments may not support the definition of an invisible key. In alternative embodiments, not all GUI parameter-setting steps 620-643 are required, for instance where the calculator provides one or more default GUI parameters.

Virtual Keysets

As disclosed above, a virtual keyset (or keyset) is a collection of virtual keys. A user may define a keyset using system keys and/or user-defined keys. FIGS. 7 and 8 provide exemplary processes for defining a keyset from the perspective of a user and a calculator system, respectively.

FIG. 7 is a flow diagram of a process for defining or modifying a keyset from a user perspective, according to an embodiment of the invention. After beginning in step 705, a user determines in conditional step 710 whether to add a new keyset, modify a keyset, or combine existing keysets. To define a new keyset, the user must first consider in conditional step 715 whether to import a keyset. If the user wishes to import a keyset, the user inputs a keyset source location in step 720 and then inputs a save command in step 725.

If the new keyset is not being imported, the user can define a first keyset in step 735. Step 735 could include selecting a pre-existing system key 330 or a user-defined key 335 from the key superset 325. Alternatively, step 735 could include defining a new key, for instance using the process in FIG. 5. Next, the user determines in conditional step 740 whether he/she is done defining keys for the new keyset. If all keys are defined, then the user can input a save command in step 745; otherwise, the user can return to step 735 to define a next key in the new keyset.

If a user wishes to modify a keyset, the user selects a keyset to modify in step 765, and then determines in step 770 whether to modify a key, delete a key, or add a key. To modify a key, the user specifies a key to modify in step 790, and then changes one or more key attributes in step 795. To delete a key, the user specifies the key to delete in step 785. To add a key, the user defines a key to add in step 775. Step 775 could include selecting a pre-existing system key 330 or a user-defined key 335 from the key superset 325. Alternatively, step 775 could include defining a new key, for instance using the process in FIG. 5. Subsequent to step 795, 785, and 775, the user can determine in conditional step 780 whether he is done modifying the selected keyset. If the user is done modifying the selected keyset, the user inputs the save command in step 745; otherwise, the user returns to conditional step 770.

If the user wishes to create a new keyset by combining keysets, the user selects two or more keysets to combine in step 760 before inputting the save command in step 745.

After the user has input the save command in step 745, the user determines in step 750 whether to export the saved keyset. If the keyset is to be exported, the user inputs an export location and/or format in step 755 before terminating the process in step 730. If the saved keyset is not being exported, the process terminates in step 730.

Variations to the process illustrated in FIG. 7 are possible. For instance, alternative embodiments may not include importing a keyset, combining keysets, and/or exporting a keyset.

FIG. 8 is a flow diagram of a process for defining or modifying a keyset from a system perspective, according to an embodiment of the invention. As illustrated in FIG. 8, the process begins in step 802 and then advances to conditional step 804 where the process determines whether to define a new keyset, modify a keyset, or combine two or more keysets. Where a new keyset is to be defined, the process determines in step 806 whether to import a keyset. If a keyset is to be imported, the process receives a keyset source location in step 808, imports the keyset in step 810, saves the keyset definition in step 812, and terminates the process in step 814. If a keyset is not being imported, the process receives a first key definition in step 816, adds the key definition to the new keyset in step 817, and then determines in conditional step 818 whether all keys have been defined. Where all keys have not been defined, the process returns to step 816; otherwise, the process advances to step 820 to save the new keyset. Step 816 could include receiving a selection of a pre-existing system key 330 or a user-defined key 335 from the key superset 325. Alternatively, step 816 could include defining a new key, for instance using the process in FIG. 6.

Where a keyset is to be modified, the process advances to step 828 to receive a keyset selection. Next, in conditional step 830, the process determines whether a key will be added to, deleted from, or modified in the selected keyset. Where a key is to be modified, the process receives a key selection in step 838, receives a change in one or more key attributes in step 840, and modifies the selected key in step 841. Where a key is to be deleted, the process receives a key selection in step 836 and deletes the selected key in step 837. Where a key is to be added, the process receives a key definition in step 832 and adds the key in step 833. Step 832 could include receiving a selection of a pre-existing system key 330 or a user-defined key 335 from the key superset 325. Alternatively, step 832 could include defining a new key, for instance using the process in FIG. 6.

Subsequent to steps 841, 837, and 833, the process determines in conditional step 834 whether modifying the keyset is complete. Where the result of conditional step 834 is answered in the affirmative, the process saves the modified keyset in step 820; otherwise, the process returns to conditional step 830.

Where it is determined in step 804 that two or more keysets are to be combined, the process displays a menu of pre-existing keysets in step 842, receives a selection of two or more keysets in step 844, combines the selected keysets in step 846, and then saves the combined keyset in step 820. After saving the new, modified, or combined keyset in step 820, the process determines in step 822 whether to export the saved keyset. If the keyset is to be exported, the process receives an export location and/or format in step 824 before exporting the keyset in step 826 and terminating the process in step 814. If the keyset is not being exported, the process terminates in step 814 after conditional step 822.

Variations to the process illustrated in FIG. 8 are possible. For instance, alternative embodiments may not include importing a keyset, combining keysets, and/or exporting a keyset.

Sessions

Figure 11:
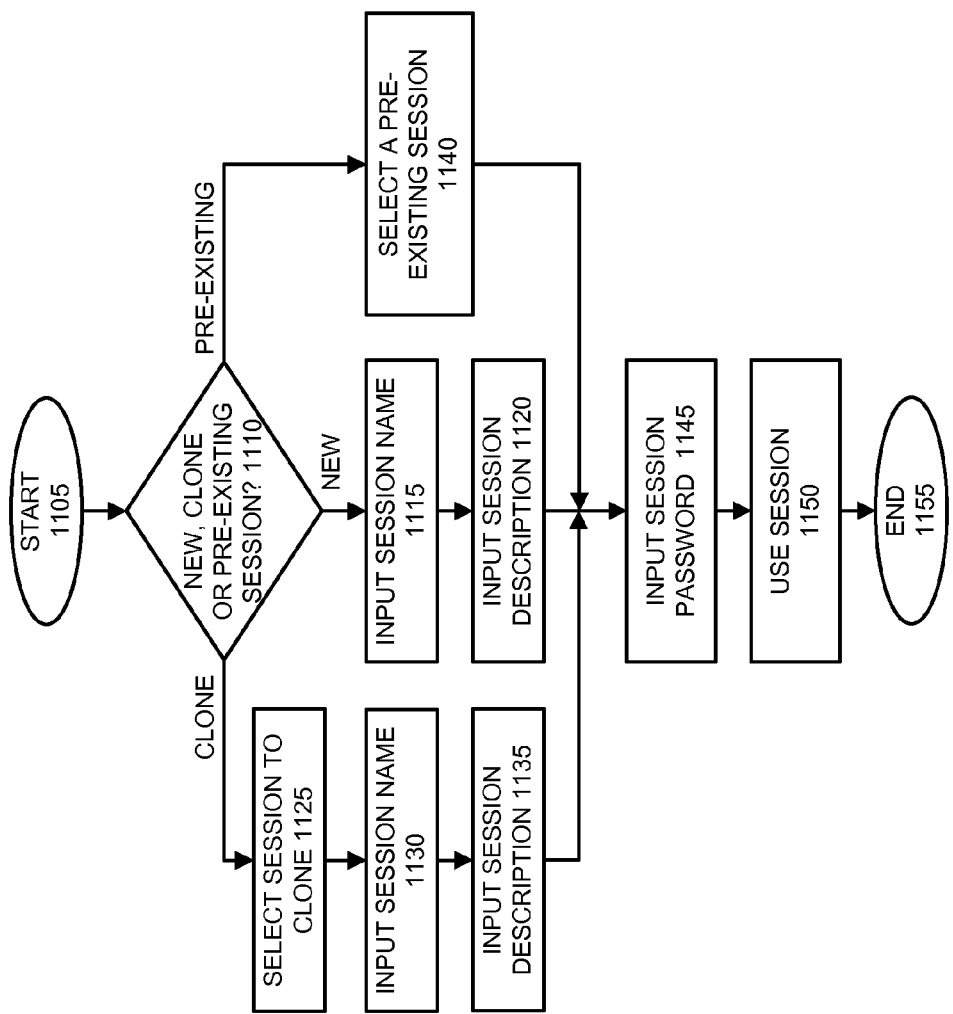
FIG. 11 is a flow diagram of a process for starting a session from a user perspective, according to an embodiment of the invention.
Figure 12:
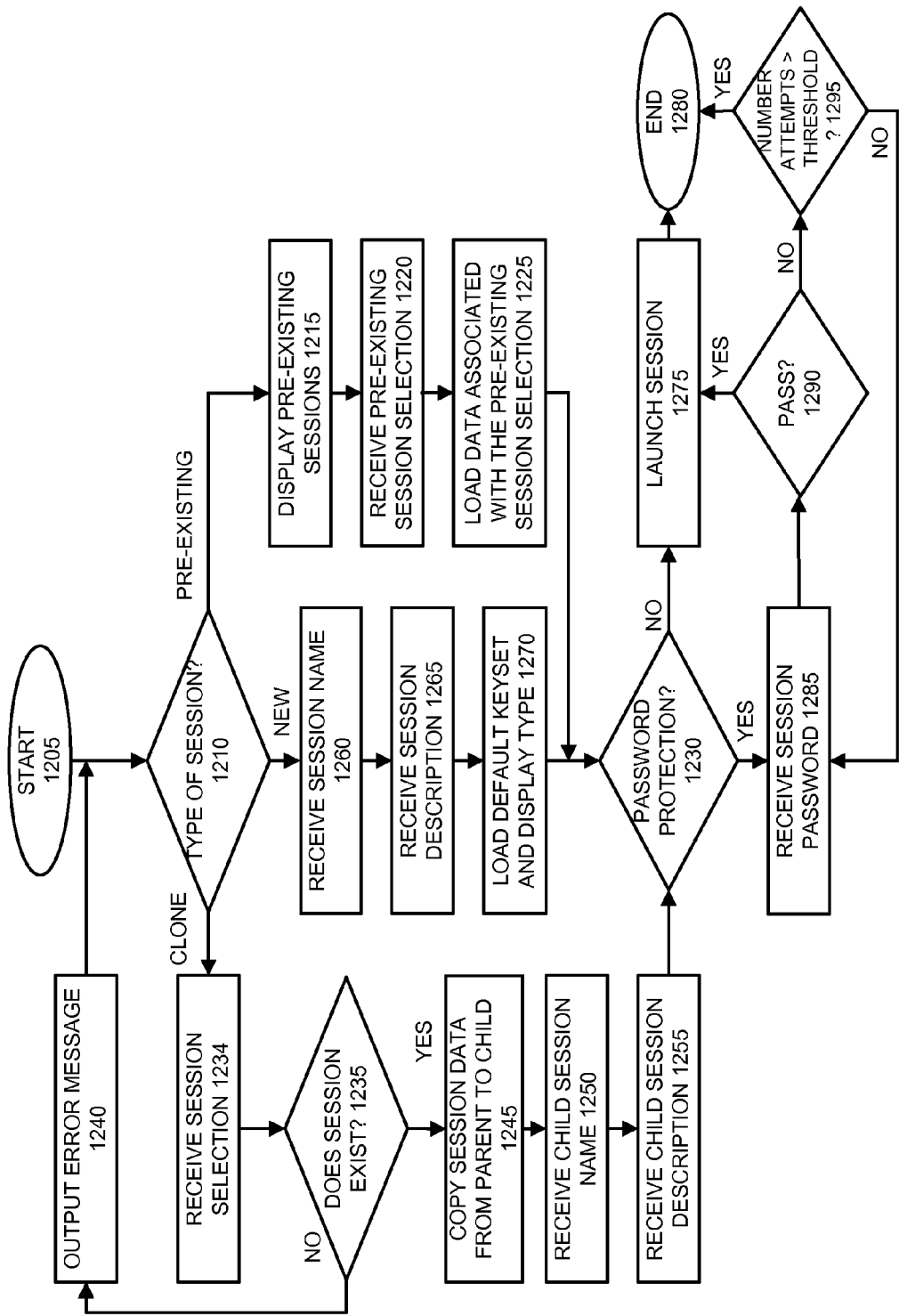
FIG. 12 is a flow diagram of a process for starting a session from a system perspective, according to an embodiment of the invention.
Figure 13:
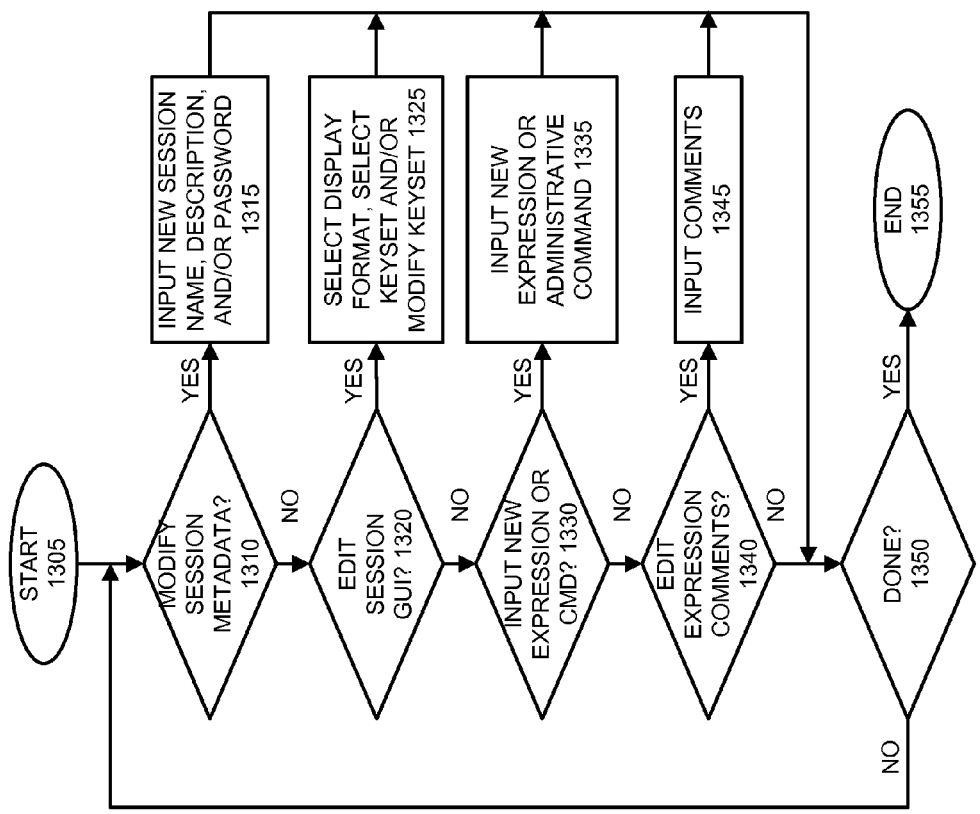
FIG. 13 is a flow diagram of a process for modifying a session from a user perspective, according to an embodiment of the invention.
Figure 14:
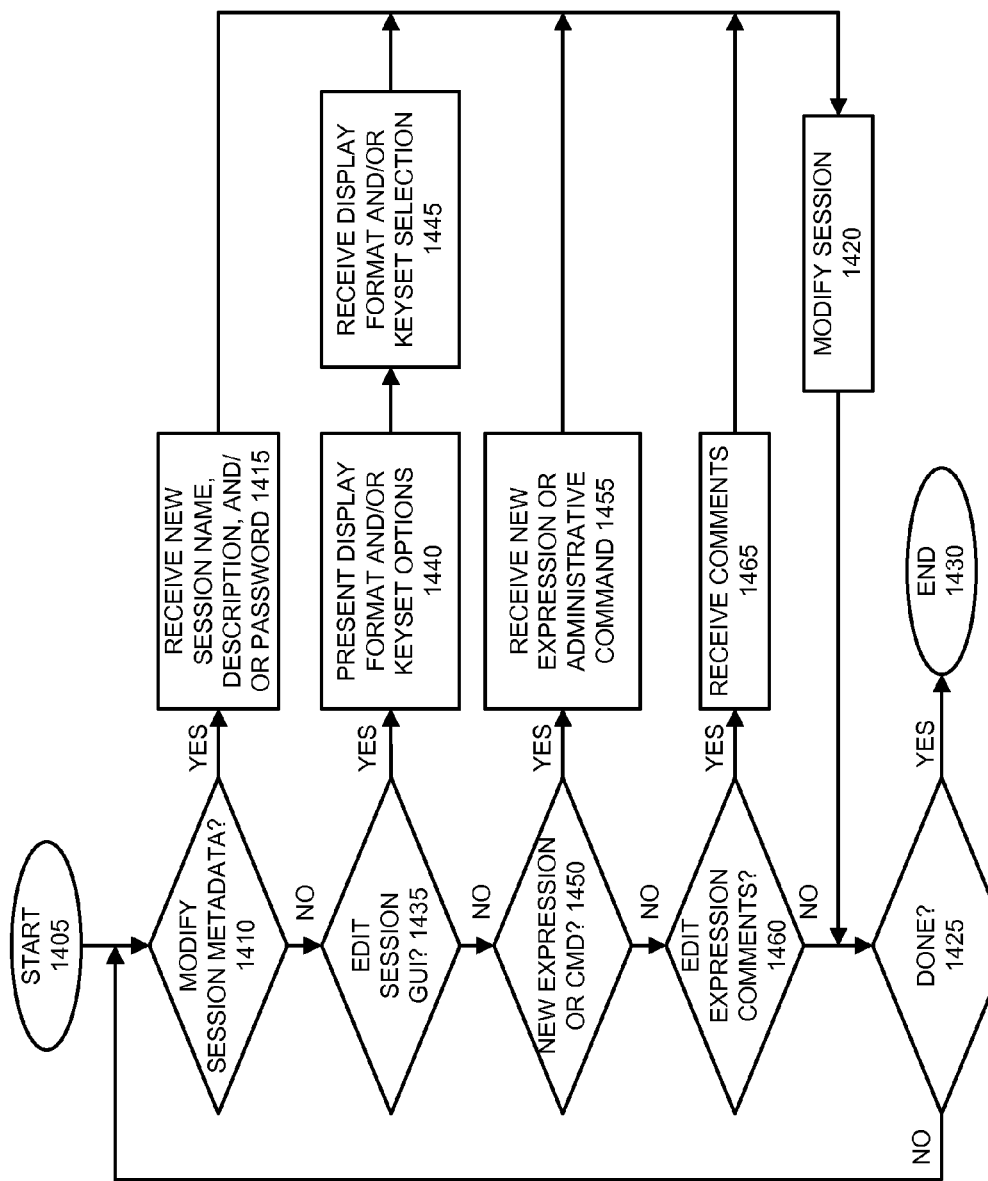
FIG. 14 is a flow diagram of a process for modifying a session from a system perspective, according to an embodiment of the invention.
Figure 15:
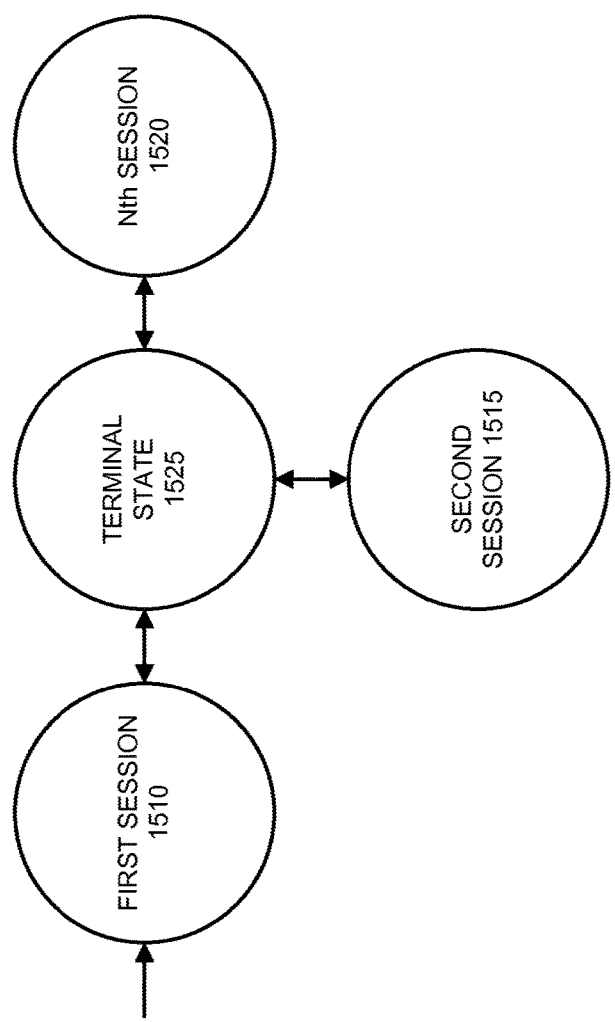
FIG. 15 is a state diagram for a single session mode of a calculator system, according to an embodiment of the invention.
Figure 16:
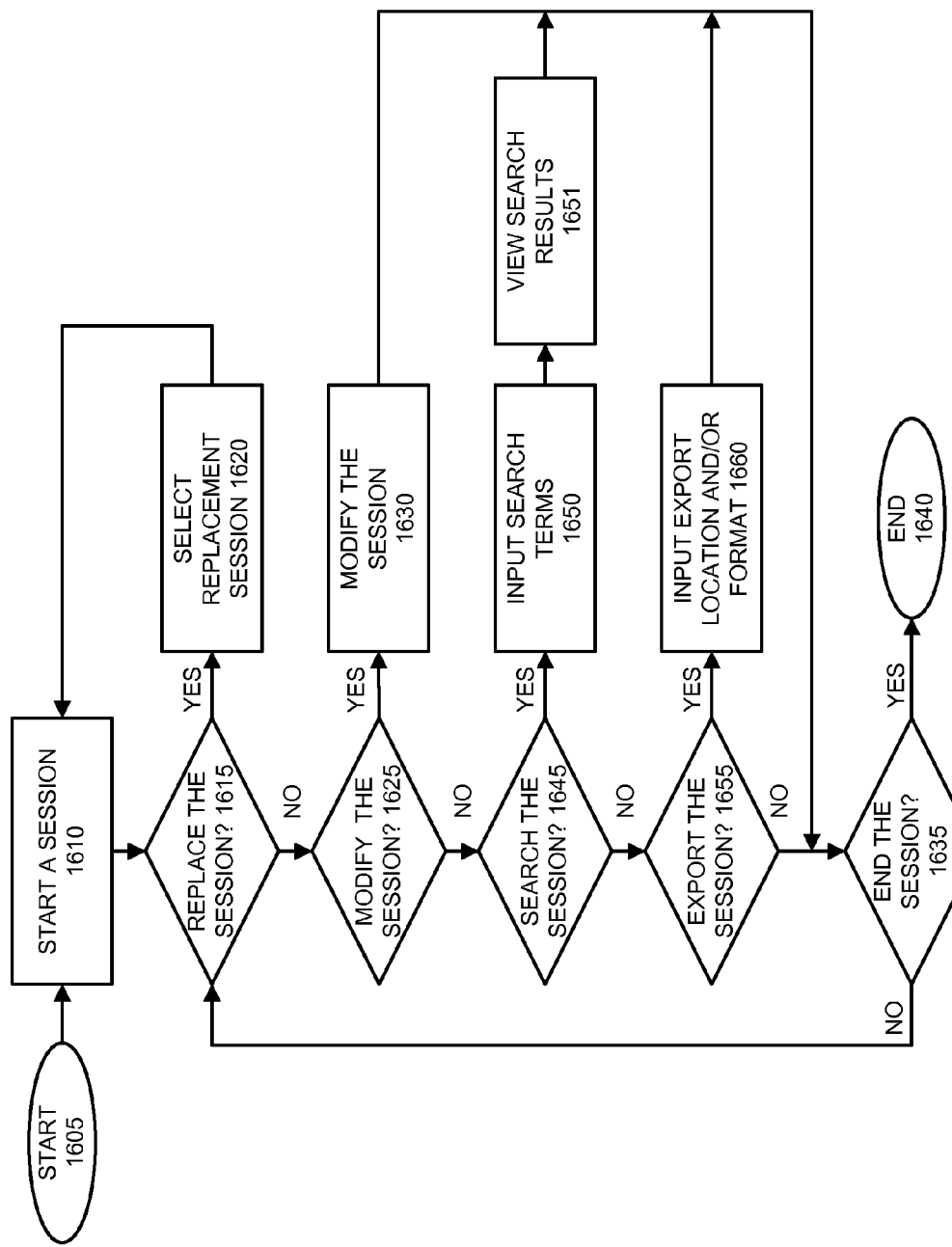
FIG. 16 is a flow diagram of a single session mode process from a user perspective, according to an embodiment of the invention.
Figure 17:
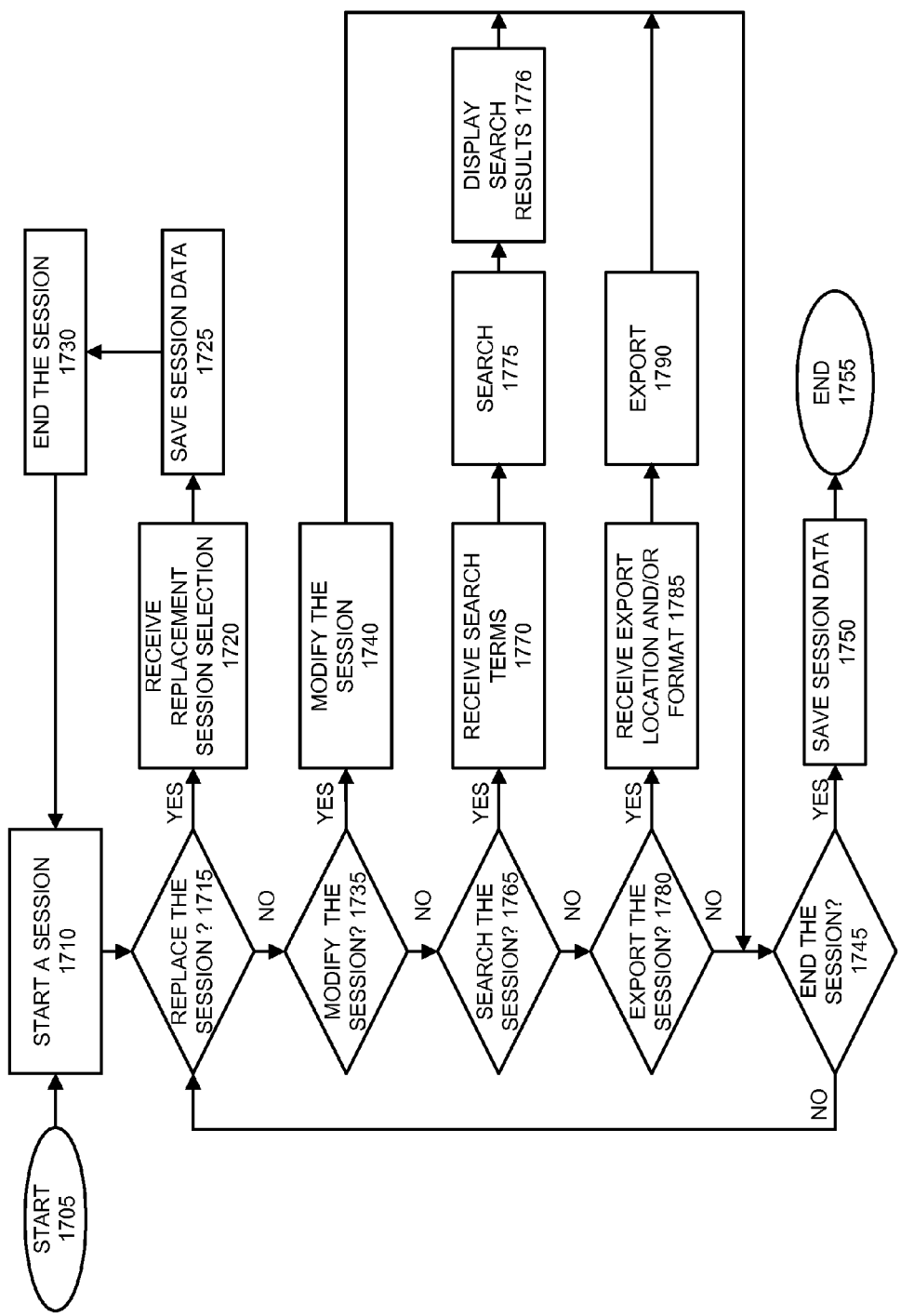
FIG. 17 is a flow diagram of a single session mode process from a system perspective, according to an embodiment of the invention.

As indicated above, a session is defined by various attributes that are associated with the calculation of a set of expressions. FIGS. 9 and 10 illustrate exemplary attributes that may be stored in a long term session memory and a transient session memory, respectively. FIGS. 11 and 12 illustrate processes for starting a session; FIGS. 13 and 14 provide processes for modifying a session. FIGS. 15-17 illustrate the management of sessions in a single-session mode, whereas FIGS. 18-20 disclose management processes for a multi-session mode.

FIG. 9 is a functional block diagram of a long term session memory, according to an embodiment of the invention. As illustrated in FIG. 9, the long-term session n memory 905 (i.e., the long-term memory for an nth calculation session) may include metadata 910, GUI attributes and operators 925, expression attributes 940, comments 975, an execution log 980, a single answer 990, and an array answer 995.

The metadata 910 may be user-defined and may include, for instance, a session name 915, description 920, and session password 985. The GUI attributes and operators 925 are preferably user-selected and may include, for example, a keyset 930 and display format 935 associated with the nth session. The expression attributes 940 includes all applicable expression components, such as constants 945, arrays 950, sets 955, variables 960, functions 965 and/or macros 970. The user-defined functions 965 and macros 970 may or may not be assigned to keys (if not, a user would have to type the syntax for the function or macro to use it). The comments 975 could be, for instance, a user's explanation of an expression. The execution log 980 maintains a sequential history of user inputs and calculator outputs for the nth session. The execution log 980 may also contain an expression log 981.

Variations to the block diagram illustrated in FIG. 9 are possible. For instance, logical groupings could be varied, according to design choice (e.g., the comments 975 could be grouped with the metadata 910). Moreover, not all illustrated attributes may apply to each session. For instance, in some embodiments or for some sessions, a session password 985 may not be required. The long term session n memory illustrated in FIG. 9 may be an example of the contents of private session memory 355. In addition, although not depicted in FIG. 9, the long term session n memory could also include one or more types of public session memory 357.

FIG. 10 is a functional block diagram of a transient session memory, according to an embodiment of the invention. As illustrated in FIG. 10, the transient session n memory 1005 (i.e., the transient memory for an nth calculation session) may include publicly-shared memory 1020 (e.g., the contents of public session memory 357). The publicly-shared memory 1020 may include, for instance, constants 1025, arrays 1030, sets 1035, and/or variables 1040, based on the portions of a session's data that a user wishes to make available to other sessions.

In embodiments of the invention, a user can create a new session, return to a pre-existing session, or clone a pre-existing session. Creating a clone is different than returning to a pre-existing session because the clone will be assigned unique metadata; other session attributes may also be changed subsequent to the cloning.

FIG. 11 is a flow diagram of a process for starting a session from a user perspective, according to an embodiment of the invention. As illustrated in FIG. 11, the process begins in step 1105. Next, in conditional step 1110, a user determines whether to start a new session, return to a pre-existing session, or clone a session. To begin a new session, the user inputs a new session name in step 1115 and a session description in step 1120. To return to a pre-existing session, the user selects the pre-existing session, for instance from a menu, in step 1140. To start a new session that is a clone of a pre-existing session, the user selects a pre-existing session in step 1125, inputs a session name in step 1130, and inputs a session description in step 1135.

Subsequent to step 1120, 1135, or 1140 the user inputs a session password in step 1145 to use the session in step 1150 before terminating the process in step 1155.

Variations to the process illustrated in FIG. 11 are possible. For instance, alternative embodiments may not allow for session cloning and/or may not require a session password.

FIG. 12 is a flow diagram of a process for starting a session from a system perspective, according to an embodiment of the invention. As illustrated in FIG. 12, the process begins in step 1205 and then advances to conditional step 1210 to determine whether a new, pre-existing, or clone session is to be started. Where a new session is to be started, the process receives a session name in step 1260, receives a session description in step 1265, and loads a default keyset and display type in step 1270.

Where a pre-existing session is to be started, the process displays pre-existing sessions in step 1215, receives a pre-existing session selection in step 1220, and loads data associated with the pre-existing session selection in step 1225. Step 1225 includes, for example, loading data described above with reference to FIG. 9.

Where a session is to be cloned, the process receives a session selection in step 1234 and then advances to conditional step 1235 to determine whether the selected session exists. Where the result of conditional step 1235 is in the negative, the process outputs an error message in step 1240 and then returns to conditional step 1210. Where the session is confirmed, the process copies session data from the selected parent session to a child session in step 1245, receives a session name for the child in step 1250, and receives a description for the child in step 1255.

If the process determines in step 1230 that the new, pre-existing, or cloned session is not password protected, then the process launches the session in step 1275 before terminating the process in step 1280. Otherwise, the process receives a session password in step 1285 and determines whether the password is correct in conditional step 1290. If the password is correct, the process advances to step 1275. If the password is not correct, the process may determine in step 1295 whether the number of password attempts is greater than a predetermined threshold. If the threshold is exceeded, the process terminates in step 1280; otherwise, the process returns to step 1285.

Variations to the process illustrated in FIG. 12 are possible. For instance, alternative embodiments may not include cloning and/or password protected sessions. Alternative embodiment could also collect more, or less, metadata associated with a new or cloned session.

FIGS. 11 and 12 thus illustrate how a calculator session can be started. FIGS. 13 and 14 show how certain session attributes can be modified for an active session.

FIG. 13 is a flow diagram of a process for modifying a session from a user perspective, according to an embodiment of the invention. As illustrated therein, a user begins in step 1305 and advances to conditional step 1310. If the user wishes to modify session metadata, the user inputs a new session name, description, and/or password in step 1315; otherwise the user advances to conditional step 1320. If the user wishes to edit the session GUI, the user may select a new display format, select a new keyset, and/or modify the keyset in step 1325; otherwise the user advances to conditional step 1330 to consider whether they wish to input a new expression or a command. In step 1335, a user can input a new mathematical expression or set of expressions (if they wish to create a function or a macro). Step 1335 may also include entering commands, for example adding or deleting constants, variables, sets and/or arrays. Step 1335 could also include entering a command that declares a constant, array, set or variable as part of publicly-shared memory 1020. In conditional step 1340, the user can decide whether to add comments to the session in step 1345. Subsequent to steps 1315, 1325, 1335, or 1345, the user may determine in conditional step 1350 whether all edits to session attribute data are complete. If so, the process terminates in step 1355; otherwise, the user can return to step 1310.

FIG. 14 is a flow diagram of a process for modifying a session from a system perspective, according to an embodiment of the invention. As illustrated therein, the process begins in step 1405 and advances to conditional step 1410. If the process determines in step 1410 that a user wishes to modify session metadata, the process receives a new session name, description, and/or password in step 1415; otherwise the process advances to conditional step 1435. If the process determines in step 1435 that a user wishes to edit the session GUI, the process may present display format and/or keyset options to the user in step 1440 and then receive a display format and/or keyset selection in step 1445; otherwise the process advances to conditional step 1450. If the process determines in step 1450 that a user wishes to input a new mathematical expression or set of expressions (if they wish to create a function or a macro) or enter a command, the process may receive a new expression, or a command for example to add or delete constants, arrays, sets, or variables in step 1445. Step 1445 could also include receiving a user command to assign a constant, array, set, or variable to publicly-shared memory 1020. If the process determines in step 1460 that a user wishes to add comments pertaining to the latest session expressions, the process may receive comments in step 1465. Subsequent to steps 1415, 1445, 1455, or 1465, the process may modify the session attributes in step 1420 before advancing to conditional step 1425. In step 1425, the process determines whether all edits to session attribute data are complete. If so, the process terminates in step 1430; otherwise, the process returns to step 1410.

FIG. 15 is a state diagram for a single session mode of a calculator system, according to an embodiment of the invention. As illustrated therein, a calculator may serially host a first session 1510, a second session 1515, and an nth session 1520. In a terminal state 1525, no session is open. Thus, the first session 1510 must be closed before the second session 1515 is opened. Likewise, the second session 1515 must be closed before the nth session 1520 is opened. FIGS. 16 and 17 provide a method for managing the single-session mode.

As illustrated in FIG. 16, a user may begin a single-session mode in step 1605 and open a (first) session in step 1610. If a user decides in conditional step 1615 to replace the first session, the user selects a replacement (second) session in step 1620. If the user decides in conditional step 1625 to modify the open session, then the user may modify the session in step 1630, for instance using the process described with reference to FIG. 13. If the user decides in step 1645 to search the session, then the user inputs search terms in step 1650 and views search results in step 1651. If the user decides in conditional step 1655 to export the session, then the user inputs an export location and/or format in step 1660. In conditional step 1635, a user can decide to terminate the session in step 1640 or continue the session by returning to conditional step 1615.

FIG. 17 is a flow diagram of a single session mode process from a system perspective, according to an embodiment of the invention. As illustrated in FIG. 17, the process begins in step 1705 and starts a new session in step 1710. If the process determines in conditional step 1715 that a user wishes to replace the first session, the process may receive a replacement session selection in step 1720, save current session data in step 1725, end the current session in step 1730, and open a next session in step 1710. If the process determines in conditional step 1735 that a user wishes to modify the session, the process may modify the session in step 1740, for instance using the process illustrated in FIG. 14. If the process determines in conditional step 1765 that a user wishes to search the session, the process may receive search terms in step 1770, perform the corresponding search in step 1775, and display search results to the user in step 1776. If the process determines in conditional step 1780 that a user wishes to export a session, the process may receive export location and/or format information from a user in step 1785 and export session attribute data in step 1790. If the process determines in conditional step 1745 that the session is over, the process may save the session data in step 1750 before terminating the session in step 1755; otherwise, the process may return to conditional step 1715.

Variations to the processes illustrated in FIGS. 15 & 16 and described above are possible. For instance, alternative embodiments may not include search and/or export steps.

Figure 18:
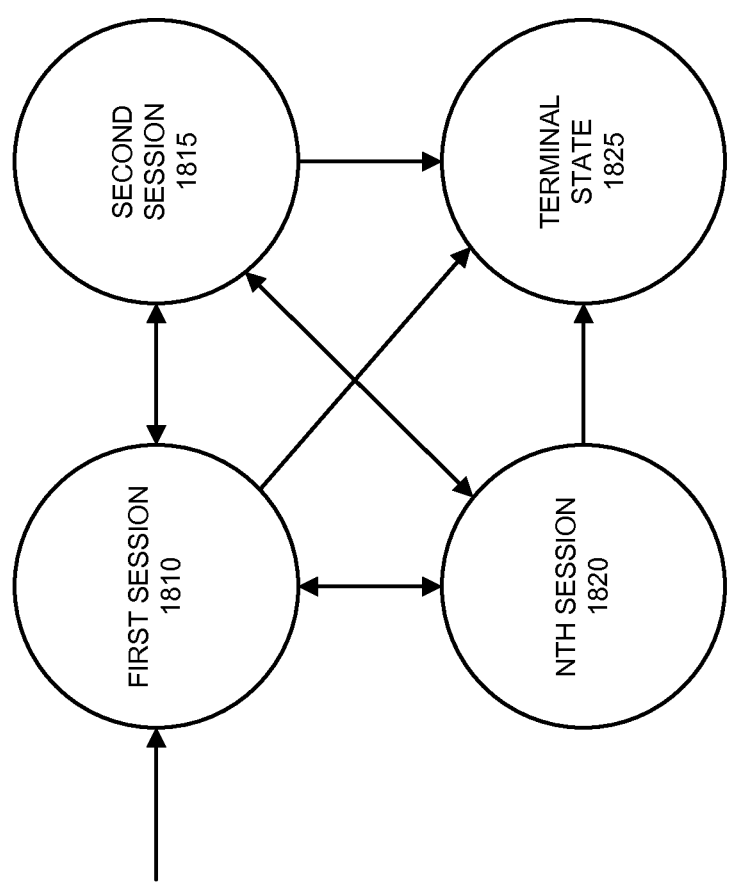
FIG. 18 is a state diagram of a multi-session mode in a calculator system, according to an embodiment of the invention.
Figure 19:
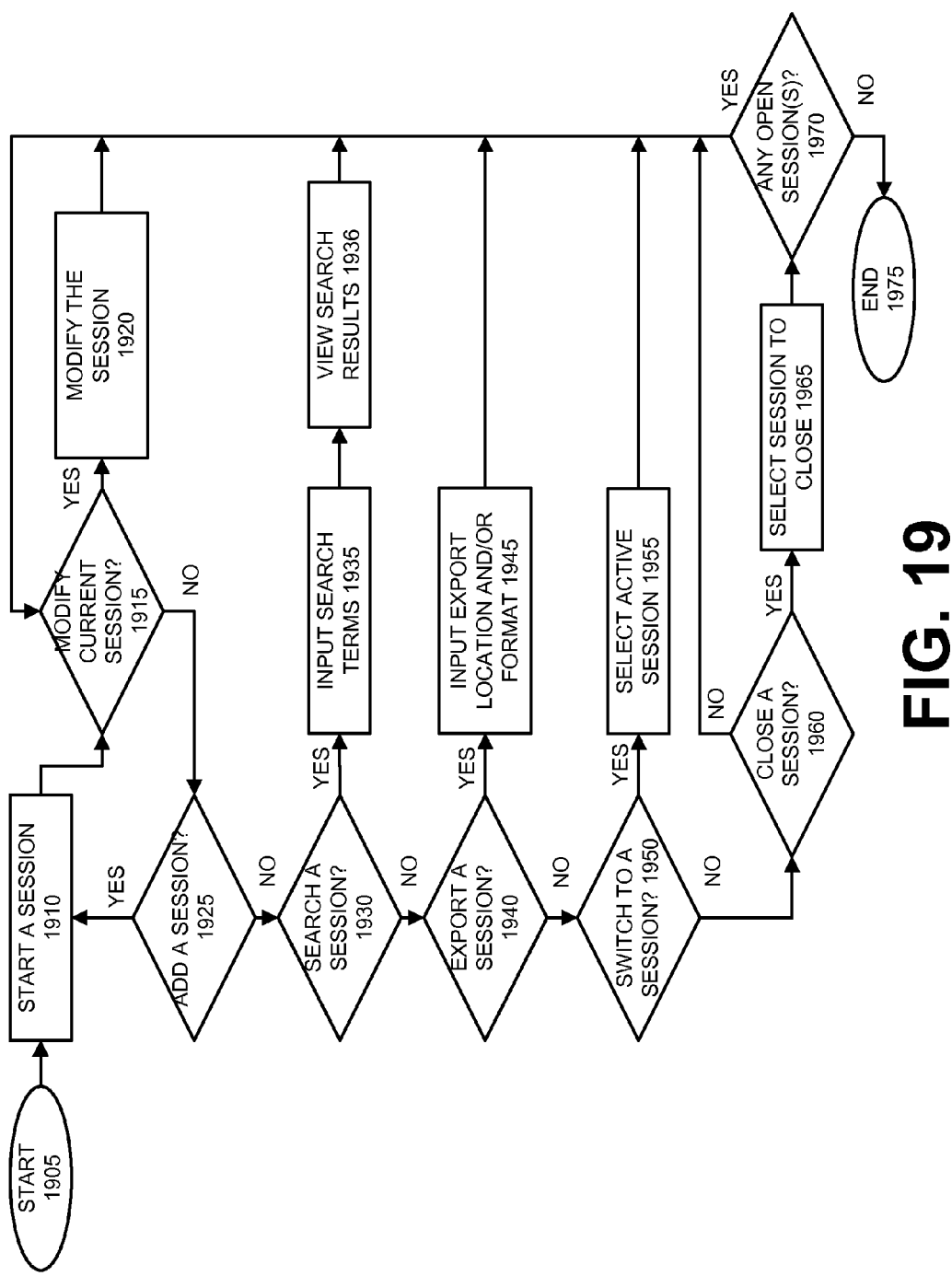
FIG. 19 is a flow diagram of a multi-session mode process from a user perspective, according to an embodiment of the invention.
Figure 20:
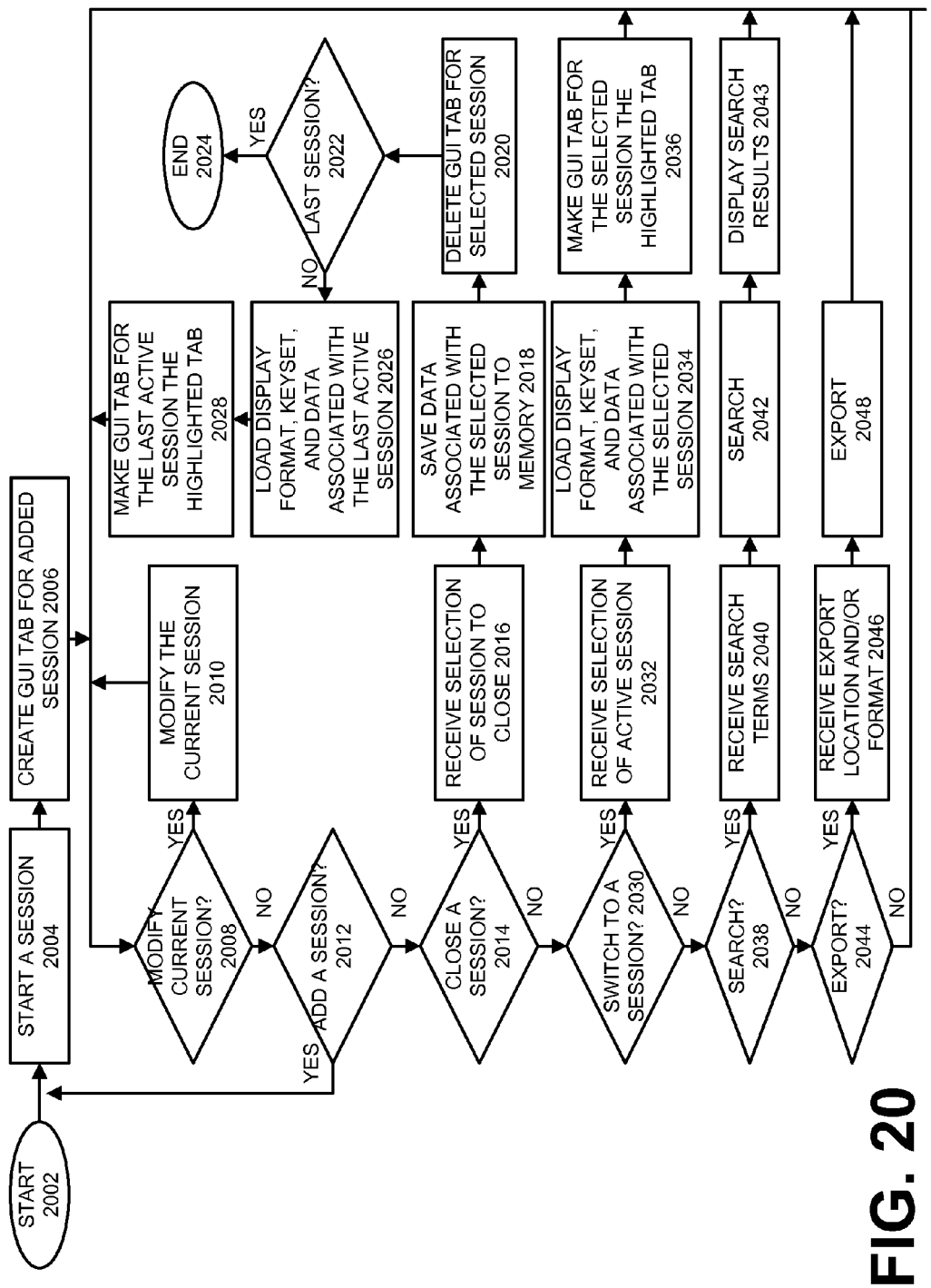
FIG. 20 is a flow diagram of a multi-session mode process from a system perspective, according to an embodiment of the invention.

FIG. 18 is a state diagram for a multi-session mode of a calculator system, according to an embodiment of the invention. As illustrated therein, a calculator may host a first session 1810, a second session 1815, and an nth session 1820. In a terminal state 1825, no session is open. Only one of the sessions 1810, 1815, or 1820 can be the active state. Note, however, that multiple sessions can be open before reaching the terminal state 1825. In embodiments of the invention, any one or more sessions 1810, 1815, and/or 1820 can be closed prior to reaching the terminal state 1825. FIGS. 19 and 20 provide processes for managing the multi-session mode.

FIG. 19 is a flow diagram of a multi-session mode process from a user perspective, according to an embodiment of the invention. As illustrated in FIG. 19, a user begins in step 1905 and starts a first session in step 1910. Next, a user determines in conditional step 1915 whether to modify the current session. If so, the user modifies the session in step 1920, for instance using the process in FIG. 13, and then returns to step 1915; otherwise the user proceeds to step 1925. If a user decides in conditional step 1925 to add a session, the user starts a second session in step 1910. If a user decides to search a session in conditional step 1930, the user would input search terms in step 1935 and view the search results in step 1936. If the user decides in conditional step 1940 to export session attributes, the user inputs an export location, such as a file pathname, and/or format in step 1945.

If the user decides in conditional step 1950 to switch to another open session, then the user would select a session to be active in step 1955. For example, if the first and second sessions are open, and the second session is active, the user could enter a command in step 1955 to make the first session active. If only a single session is open, the user does not have the option in conditional step 1950 to switch to another open session. If a user decides in conditional step 1960 to close a session, the user selects a session to close in step 1965. The operational process requires at least one open session. Accordingly, if it is determined by a system in step 1970 that no sessions are open, the process terminates in step 1975.

Variations to the process illustrated in FIG. 19 and described above are possible. For instance, alternative embodiments may not include steps related to the search and/or export features.

FIG. 20 is a flow diagram of a multi-session mode process from a system perspective, according to an embodiment of the invention. As illustrated in FIG. 20, the process begins in step 2002 and then starts a first session in step 2004. Next, the process creates a Graphical User Interface (GUI) tab for the added session in step 2006. Then, in conditional step 2008, the process determines whether a user wishes to modify the current session. Where a session is to be modified, the process modifies the session in step 2010, for example using the process in FIG. 14, before returning to conditional step 2008. Where a current session is not to be modified, the process determines in conditional step 2012 whether to add a session. Where a session is to be added, the process returns to step 2004 to start a session; otherwise, the process advances to conditional step 2014 to determine whether to close a session.

Where a session is to be closed, the process receives a selection of the session to close in step 2016, saves data associated with the selected session to memory in step 2018, and deletes a GUI tab for the selected session in step 2020. If the process determines in step 2022 that the session being closed is the last open session, then the process terminates in step 2024; otherwise, the process loads display format, keyset, and data associated with the last active session in step 2026 and makes a GUI tab for the last active session the highlighted tab in step 2028 before returning to conditional step 2008.

In conditional step 2030, the process determines whether a user wishes to switch to a different session. If so, and if more than one session is open, the process receives selection of an active session in step 2032, loads display format, keyset, and data associated with the selected session in step 2034, and makes a GUI tab for the selected session the highlighted tab in step 2036.

The process determines in conditional step 2038 whether to perform a search on session attributes. If so, the process receives search terms in step 2040, performs the search in step 2042, and displays search results in step 2043. In conditional step 2044, the process determines whether to export session data. If such data is to be exported, the process receives export location information and/or format in step 2046 and exports the attribute data in step 2048; otherwise the process returns to step 2008.

Variations to the process illustrated in FIG. 20 are possible. For example, in alternative embodiments, it is possible to terminate the process in step 2024 without closing each of multiple open sessions individually. Moreover, alternative embodiments could use GUI tab positioning or other methods in lieu of highlighting to indicate the active session. In addition, alternative embodiments may not contain all features; for instance the search and/or export features may not be supported, according to design choice.

Expressions

An expression is a set of instructions that produces a single result or a single set of results. Such expressions may include one or more functions and/or macros and their operands or arguments. Functions and macros perform predetermined tasks; macros are distinguished in that they involve an abbreviated instruction that relates to a series of recorded user statements.

Figure 22:
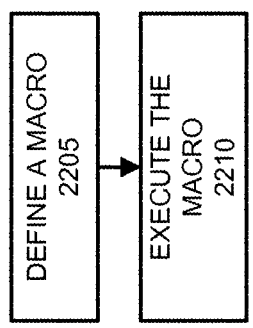
FIG. 22 is a flow diagram of a macro process, according to an embodiment of the invention.
Figure 21:
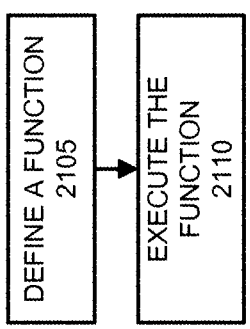
FIG. 21 is a flow diagram of a function process, according to an embodiment of the invention.
Figure 24:
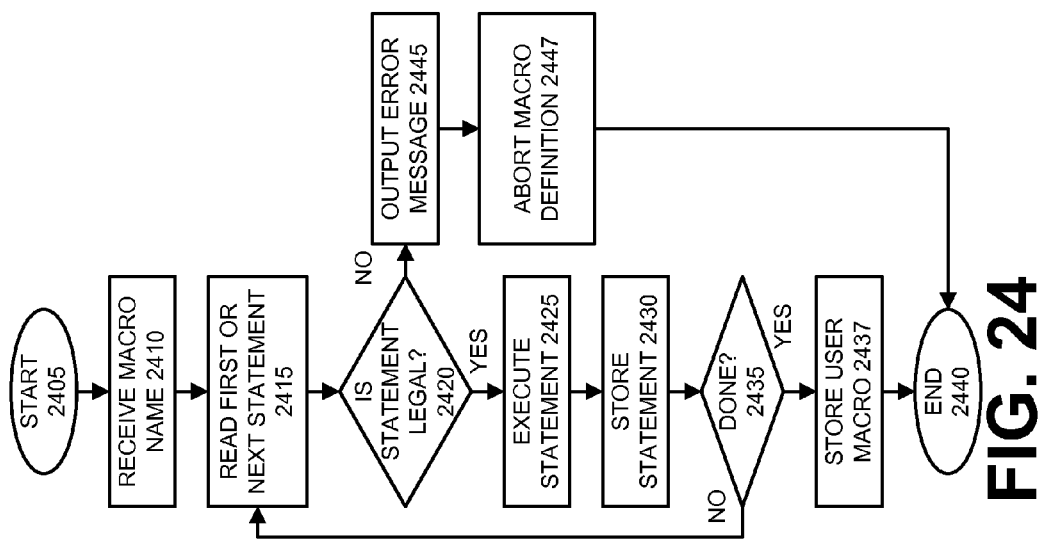
FIG. 24 is a flow diagram of a macro definition process, according to an embodiment of the invention.
Figure 23:
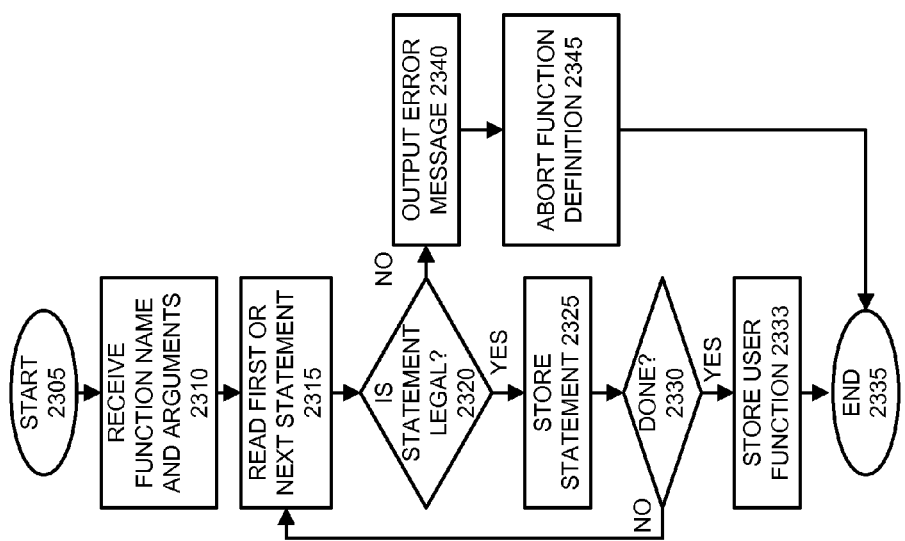
FIG. 23 is a flow diagram of a function definition process, according to an embodiment of the invention.

FIG. 21 is a flow diagram of a function process, according to an embodiment of the invention; FIG. 22 is a flow diagram of a macro process, according to an embodiment of the invention. These Figs. Illustrate that functions and macros must be defined before they can be executed. More specifically, FIG. 21 illustrates that a function definition step 2105 precedes a function execution step 2110. Likewise, FIG. 22 shows that a macro defining step 2205 is required before a macro execution step 2210. FIGS. 23 and 24 illustrate exemplary definition steps for functions and macros, respectively.

FIG. 23 is a flow diagram of a function definition process, according to an embodiment of the invention. As illustrated therein, a function definition process begins in step 2305 and then receives a function name and arguments in step 2310. Next, in step 2315, the process reads a first statement. Then, in conditional step 2320, the process determines whether the read statement is legal. Where the statement is not legal, the process outputs an error message in step 2340 and aborts the function definition in step 2345 before terminating in step 2335; otherwise, the process advances to step 2325 to store a statement. In conditional step 2330, the process determines whether the definition is complete. Where it is determined in step 2330 that the definition is complete, the process stores the user function definition in step 2333 before terminating in step 2335; otherwise, the process returns to step 2315 to read a next statement in the function. Storing step 2333 may include storing the function as a user-defined function 347 and associating the function as a part of session memory 355 and/or 357.

FIG. 24 is a flow diagram of a macro definition process, according to an embodiment of the invention. As shown, the definition process begins in step 2405 and then receives a macro name in step 2410. Next, in step 2415, the process reads a first statement of the macro. In conditional step 2420, the process determines whether statement is legal. If the statement is not legal, the process outputs an error message in step 2445, and aborts the macro definition in step 2447 before terminating in step 2440. If the statement is legal, the process executes the statement in step 2425 and stores the statement in step 2430. A result of step 2425 may be an entry in the execution log 980. Next, the process determines in conditional step 2435 whether the macro definition process is complete. If the process is complete, the macro is stored in step 2437 before terminating in step 2440; otherwise, the process returns to step 2415 to read a next statement in the macro. Storing step 2437 may include storing the macro as a user-defined macro 347 and associating the macro as a part of session memory 355 and/or 357.

Once any function or macro has been defined, it is possible to produce an expression result by explicitly using them in an expression.

Figure 25:
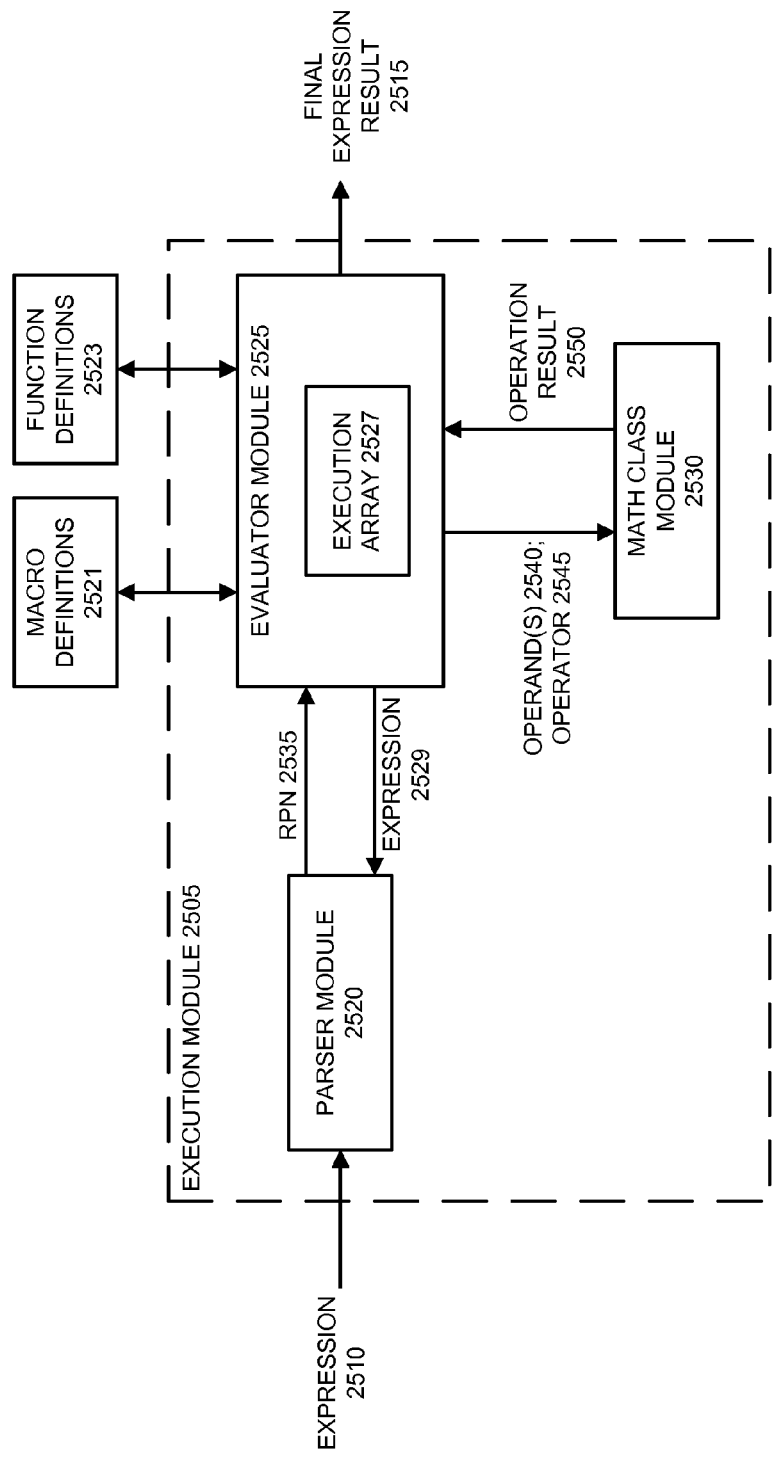
FIG. 25 is a functional block diagram of an execution module, according to an embodiment of the invention.

FIG. 25 is a functional block diagram of an execution module, according to an embodiment of the invention. As illustrated therein, an execution module 2505 is configured to receive an expression 2510 and output a final expression result 2515. Internal to the execution module 2505, a parser module 2520 is coupled to receive the expression 2510 and configured to output statements in Reverse Polish Notation (RPN) format 2535 to an evaluator module 2525.

RPN format 2535 takes into account each operator's precedence level. Operators with higher precedence get placed in the RPN before operators of lower precedence, so they can be executed before operators of less precedence. In RPN, the operator follows its operands. The precedence levels of each operator are specified by the system for system operators and by the user for user-defined macros and functions, at the point of creation. Parentheses in expressions 2510 or 2529 may alter the normal precedence order The evaluator module 2525 is configured to send operators 2545 and their operands 2540 to a math class module 2530. The evaluator module 2525 is also configured to receive operation results 2550 from the math class module 2530 and include the operation result 2550 as an operand for a next operation (if applicable). If there is not a next operation, then the evaluator module 2525 is configured to output the operation result 2550 as the final expression result 2515.

If the expression 2510 includes a macro and/or function, the evaluator module 2525 is configured to retrieve a macro definition(s) 2521 and/or a function definition(s) 2523, as appropriate, to aid in evaluation. The macro definitions 2521 may be a macro attribute 970; the function definitions 2523 may be a function attribute 965. The execution array 2527 is configured to store expressions of macros and functions. The evaluator module 2525 is configured to output expressions 2529 from the execution array 2527 to the parser module 2520 in the order they were stored. The parser module 2520 is configured to convert each of the expressions 2529 to RPN format 2535. The Parser module 2520 is also configured to output the RPN 2535 expressions to the evaluator module 2525. Accordingly, the execution module 2505 may operate recursively where the expression 2510 includes any instances or combinations of functions and macros.

Figure 26:
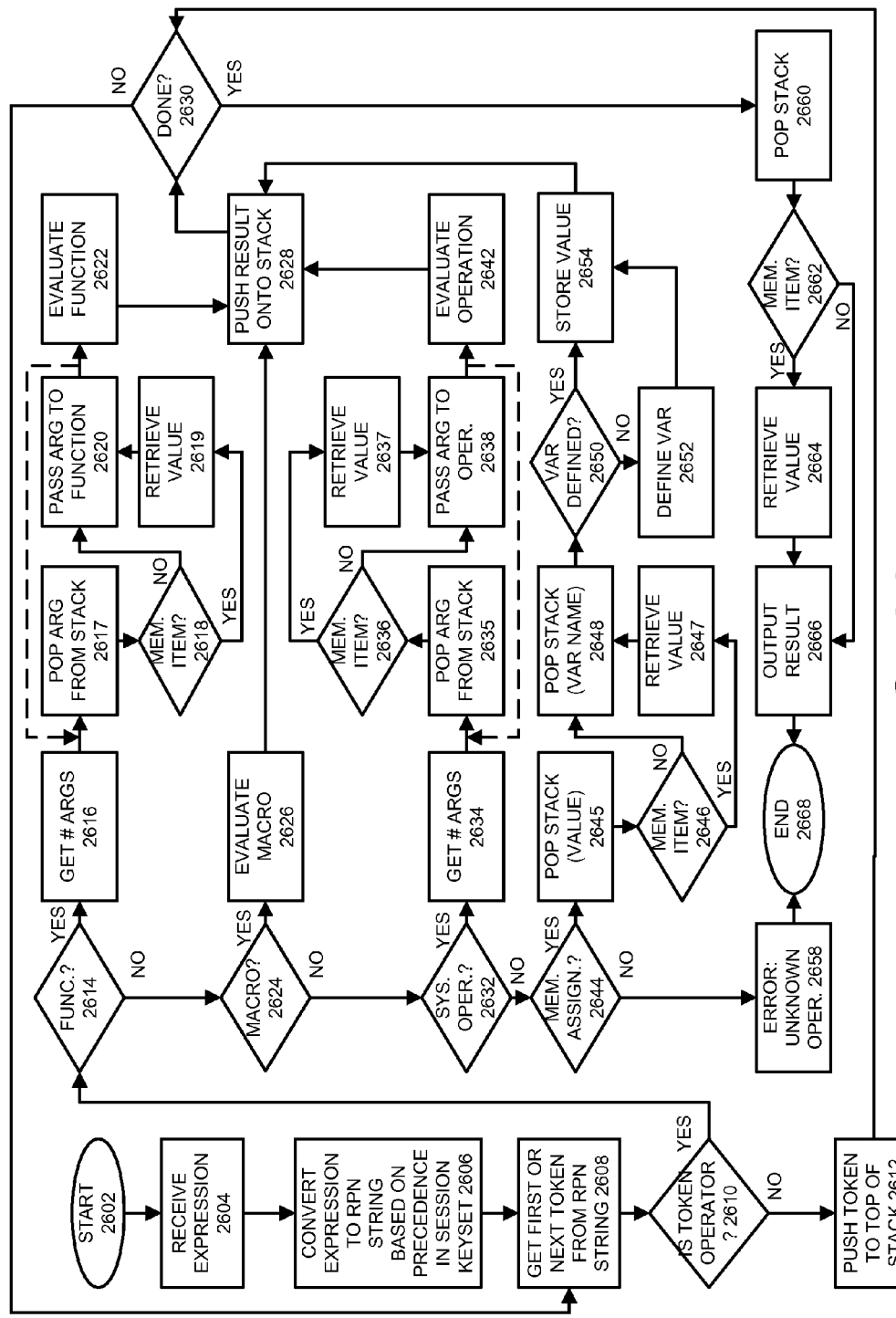
FIG. 26 is a flow diagram of an execution process, according to an embodiment of the invention.

FIGS. 26-28 provide example processes that may be performed by the execution module 2505.

FIG. 26 is a flow diagram of an execution process, according to an embodiment of the invention. As illustrated therein, the process begins in step 2602 and then receives an expression in step 2604. Next, in step 2606, the process converts the expression to an RPN string which takes into account operator precedence specified for each key in the session's keyset. Operator precedence may also be altered by the use of parenthesis in the expression that is received in step 2604.

The process then gets a first or next token from the leading edge of the RPN string in step 2608. As used herein, a token could be an operator or an operand. In step 2610, the process determines whether the token is an operator. The operator could be, for instance, a function, a macro, a non-memory-assigning system operator, or a memory assignment system operator. If the token is not an operator (in other words, the token is an operand), the process pushes the token to the top of an operand stack in step 2612 and then proceeds to conditional step 2630; otherwise, the process advances to conditional step 2614.

In conditional step 2614, the process determines whether the token is a function. If so, the process determines the number of arguments associated with the function in step 2616 (for instance, based on the function definition) and pops the appropriate number of arguments from the operand stack in step 2617. If the operand stack does not contain the appropriate number of arguments, an error results and the process is terminated. In conditional step 2618, the process determines whether any popped arguments are memory items. If so, the process retrieves their values from memory in step 2619. The process then passes the popped or retrieved values as arguments to the function in step 2620, and then evaluates the function in step 2622.

If the process determines in step 2614 that the token is not a function, the process advances to step 2624 to determine whether the token is a macro. If the token is a macro, the process evaluates the macro in step 2626; otherwise the process advances to conditional step 2632.

In conditional step 2632, the process determines whether the token is a non-memory-assigning system operator. If the token is a non-memory-assigning system operator, the process determines the number of arguments associated with the system operator in step 2634 and pops the appropriate number of arguments from the operand stack in step 2635. If the operand stack does not contain the appropriate number of arguments, an error results and the process is terminated. In conditional step 2636, the process determines whether any popped arguments are memory items. If so, the process retrieves their values from memory in step 2637. The process then places the popped or retrieved values as arguments into an arguments list, which gets passed to the system operator in step 2638 and evaluated in step 2642. The process takes care to retain the order of the arguments as they came in from the user, before handing them over to the operator.

In embodiments of the invention, non-memory-assigning system operators could be drawn, for example, from the following operation classes: arithmetic; logarithmic and exponential; various numeric representations (e.g., binary, octal, hexadecimal, scientific and exponential, decimal, polar coordinates and fractions); logic operations (e.g., AND, OR, NOT, XOR); set theory operations (e.g., create sets, intersect, unite, complement sets, etc); statistics; conversion of units of measure (e.g., weight, distance, temperatures); trigonometry; hyperbolic functions; vector algebra; matrix operations; round/ceiling/floor; complex number operations; and perhaps programming functions. Other operation classes are also possible, according to design choice.

If the process determines in step 2632 that the token is not a non-memory-assigning system operator, the process advances to step 2644 to determine whether the token is a memory assignment operator. If the token is a memory assignment operator, the process pops an argument from the operand stack in step 2645. If the operand stack is empty, an error results and the process is terminated. In conditional step 2646, the process determines whether the popped argument is a memory item. If the popped argument is a memory item, the process retrieves its value from memory in step 2647.

The process pops the operand stack once more in step 2648 for the variable name (in this context we are using the term "variable" to label all memory elements: arrays, sets, variables and constants). If the variable name has improper syntax, the process may output a "memory not well named" error and then terminate. Otherwise, the process determines in conditional step 2650 whether the variable name is defined. If necessary, the variable is defined in step 2652 before storing the value (retrieved in step 2647) in step 2654; otherwise the process just advances to storing step 2654.

In embodiments of the invention, each memory item includes three structural components: the element's name, the element's type (array, variable, set or constant), and a contents part containing the value(s). Accordingly, step 2652 creates that memory structure and stores the name, type, and contents. The type may be based on the memory assignment operator. For instance, "SAVE_SET" makes this a "set" type, an "=" makes it a "variable" type, and a "SAVE_ARRAY" makes it an "array" type. The difference between an array and a set is that an array's values are in an order which matters to the user, whereas as set's elements do not have an order that the user cares about. The difference between a variable and a constant is that, once created, the constant's value cannot change.

If the process determines in step 2644 that the token is not a memory assignment operator, the process outputs an error message indicating an unknown operator type in step 2658 before terminating in step 2668.

Subsequent to evaluation step 2622, 2626, 2642 or 2654, the process pushes a result onto the operand stack in step 2628 and then determines in conditional step 2630 whether the evaluation is complete. The evaluation is complete when there are no more tokens to consider in the RPN string. Moreover, the evaluation should be complete when there is only one cell (associated with the final expression result) remaining in the operand stack.

If the evaluation is not complete, the process returns to step 2608 to pick a next token from the leading edge of the RPN string; otherwise the process pops the operand stack in step 2660 and determines in conditional step 2662 whether the popped operand is a memory item. If the operand is a memory item, the process retrieves the associated value from memory in step 2664 and outputs the expression result in step 2666 before terminating in step 2668; otherwise, the process advances directly to step 2666.

The execution of function evaluation step 2622 and macro evaluation step 2626 requires the process to call itself in a recursive manner, since functions and macros are lists of expressions (an expression which embodies other expressions). The recursion terminates since it terminates for each operation which is not a macro or a function notwithstanding user error. Preferably, macros and functions are not allowed to call themselves.

The process illustrated in FIG. 26 and described above may be performed by the execution module 2505. More specifically, the parser module 2520 may perform receiving step 2604 and conversion step 2606; the math class module 2530 may perform evaluation step 2642; and the evaluator module 2525 may execute all other illustrated processes.

FIG. 27 is a flow diagram of a function execution process, according to an embodiment of the invention. The illustrated process is an embodiment of the process described in steps 2616-2622 above. As shown in FIG. 27, the process begins in step 2705 and looks up a function definition in step 2710. Although not shown in FIG. 27, if a function definition cannot be found, the process may output an error message and then abort. Otherwise, the process populates an execution array in step 2713 based on the function definition. The process then verifies the correctness of arguments in step 2715, and replaces the arguments with passed-in values in step 2720 for all expressions of the function. The process evaluates a first or next function statement from the execution array in step 2725, and outputs its result as an intermediate function result in step 2730. In conditional step 2735, the process determines whether the function is complete (i.e., all function statements are processed). If the function is complete, the process outputs the last intermediate result as the final function result in step 2737 and terminates in step 2740; otherwise, the process returns to step 2725 to evaluate a next statement in the function.

FIG. 28 is a flow diagram of a macro execution process, according to an embodiment of the invention. The illustrated process is an example of macro evaluation step 2626. As illustrated in FIG. 28, the process starts in step 2805, and looks up a macro definition in step 2810. Although not shown in FIG. 28, if no macro exists by that name, the process outputs an error message and aborts. Otherwise, the process populates an execution array based on the macro definition in step 2813, evaluates a first or next macro statement from the execution array in step 2815 and outputs its result as an intermediate result in step 2820. In conditional step 2825, the process determines whether the macro is complete (i.e., all macro statements are processed). If the macro is complete, the process outputs the last intermediate result as the final macro result in step 2827 and terminates in step 2830; otherwise, the process returns to step 2815 to evaluate a next macro statement.

Any of the processes described herein, for instance with reference to FIGS. 6, 8, 12, 14, 17, 20, 23, 24 and 26-28, may be implemented in hardware, software, or a combination of hardware and software, according to design choice.

Embodiments of the invention provide, among other things, an improved calculator system. In one respect the improved calculator may have a highly-configurable user interface. In another respect, the improved calculator may include session management features that accommodate single or multiple calculation sessions. In another respect, the improved calculator may allow users to create their own functions.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention. In addition, although references are made to embodiments of the invention, all embodiments disclosed herein need not be separate embodiments. In other words, features disclosed herein can be utilized in combinations not expressly illustrated.

I claim:

1. A calculator comprising:
a processor; and
a memory coupled to the processor, the memory including:
a key superset having attributes associated with a plurality of system-defined keys and at least one user-defined key;
at least one user-defined keyset, the at least one user-defined keyset including a subset of the key superset; and
a session memory configured to store attributes associated with a plurality of calculator sessions, wherein each of the plurality of calculator sessions is associated with the evaluation of at least one expression, and wherein the attributes associated with the plurality of calculator sessions include a history of user inputs and calculator outputs for each of the plurality of calculator sessions, wherein the session memory includes:
a private session memory; and
a public session memory, the private session memory being restricted to one of the plurality of calculator sessions, the public session memory configured for access by each of the plurality of calculator sessions.

* * * * *